US007146267B2

(12) United States Patent
Sawada et al.

(10) Patent No.: US 7,146,267 B2
(45) Date of Patent: Dec. 5, 2006

(54) ENGINE CONTROL APPARATUS

(75) Inventors: Satoshi Sawada, Tokyo (JP); Ryoichi Hanazaki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 65 days.

(21) Appl. No.: 11/201,183

(22) Filed: Aug. 11, 2005

(65) Prior Publication Data

US 2006/0229797 A1 Oct. 12, 2006

(30) Foreign Application Priority Data

Apr. 7, 2005 (JP) ............................. 2005-110737

(51) Int. Cl.
*F01L 1/34* (2006.01)
(52) U.S. Cl. ................. 701/101; 123/90.15; 123/90.17
(58) Field of Classification Search ................ 701/101, 701/102, 103; 123/90.1, 90.15, 90.17, 90.31
See application file for complete search history.

(56) References Cited

U.S. PATENT DOCUMENTS

| 5,255,192 | A | * | 10/1993 | Ito et al. .................. 701/90 |
| 5,715,779 | A | * | 2/1998 | Kato et al. ............... 123/90.15 |
| 6,006,707 | A | * | 12/1999 | Ito ........................... 123/90.15 |
| 6,213,069 | B1 | * | 4/2001 | Wada et al. .............. 123/90.15 |
| 6,834,627 | B1 | * | 12/2004 | Hiraku et al. ............ 123/90.15 |
| 2001/0019267 | A1 | * | 9/2001 | Shimizu et al. ............ 324/386 |
| 2004/0187815 | A1 | * | 9/2004 | Hiraku et al. ............ 123/90.15 |

FOREIGN PATENT DOCUMENTS

| JP | 2001-164980 A | 6/2001 |
| JP | 2002-309994 A | 10/2002 |

* cited by examiner

*Primary Examiner*—John T. Kwon
(74) *Attorney, Agent, or Firm*—Sughrue Mion, PLLC

(57) ABSTRACT

An engine control apparatus includes a valve operating mechanism for transmitting the rotation of a crankshaft to camshafts through a timing wrapping member. A control unit includes a phase detection section that detects the phase of a camshaft relative to the crankshaft, an abnormality determination section that makes, based on the detected phase, a determination whether the valve operating mechanism is abnormal, a threshold storage section that stores determination references as a lower limit threshold and an upper limit threshold, an initial phase storage section that stores, as an initial phase, a phase detected at the time of engine installation, and a phase correction section that corrects the phase detected during engine operation by using the initial phase thereby to calculate a corrected phase. The abnormality determination section outputs an abnormality determination signal when the corrected phase deviates from a determination reference range of from the lower to upper limit thresholds.

12 Claims, 13 Drawing Sheets

FIG. 7

| PHASE | ORIGINAL STATE | DETERMINATION RESULT | DIFFERENCE |
|---|---|---|---|
| A1 | NORMAL | NORMAL | O |
| A2 | NORMAL | NORMAL | O |
| A3 | ABNORMAL | ABNORMAL | O |
| A4 | ABNORMAL | ABNORMAL | O |
| B1 | NORMAL | NORMAL | O |
| B2 | NORMAL | NORMAL | O |
| B3 | ABNORMAL | ABNORMAL | O |

FIG. 11

| PHASE | ORIGINAL STATE | DETERMINATION RESULT | DIFFERENCE |
|---|---|---|---|
| A1 | NORMAL | NORMAL | O |
| A2 | NORMAL | NORMAL | O |
| A3 | ABNORMAL | ABNORMAL | O |
| A4 | ABNORMAL | ABNORMAL | O |
| B1 | NORMAL | NORMAL | O |
| B2 | NORMAL | NORMAL | O |
| B3 | ABNORMAL | ABNORMAL | O |

FIG. 13

| PHASE | ORIGINALLY | FIRST THRESHOLD SETTING | | SECOND THRESHOLD SETTING | |
|---|---|---|---|---|---|
| | | DETERMINATION RESULT | DIFFERENCE | DETERMINATION RESULT | DIFFERENCE |
| A1 | NORMAL | ABNORMAL | × | NORMAL | ○ |
| A2 | NORMAL | NORMAL | ○ | NORMAL | ○ |
| A3 | ABNORMAL | NORMAL | × | NORMAL | × |
| A4 | ABNORMAL | ABNORMAL | ○ | ABNORMAL | ○ |
| B1 | NORMAL | NORMAL | ○ | NORMAL | ○ |
| B2 | NORMAL | ABNORMAL | × | NORMAL | ○ |
| B3 | ABNORMAL | ABNORMAL | ○ | ABNORMAL | ○ |

ENGINE CONTROL APPARATUS

BACKGROUND OF THE INVENTION

1. Field of the Invention

The present invention relates to an engine control apparatus that is provided with a valve operating mechanism using a timing wrapping member such as a timing belt, etc., and in particular, it relates to such an engine control apparatus that can determine the state of an engine based on a phase shift or deviation of a camshaft relative to a crankshaft generated due to a secular change (expansion, wear, etc.) in a timing wrapping member by detecting such a phase shift upon occurrence thereof, inform, if determined that the timing wrapping member is abnormal, a driver or operator of the state of occurrence of abnormality in the timing wrapping member by performing appropriate processing such as warning, stopping fuel supply, etc., based on the output of an abnormality determination signal, and stop the operation of an engine whose timing wrapping member is in an abnormal state.

2. Description of the Related Art

In general, a valve operating mechanism for an engine includes a timing wrapping member such as a timing belt, etc., to drive an intake cam and an exhaust cam in synchronization with a crankshaft. In addition, there are also provided a crank angle sensor for detecting the rotational position of a crankshaft and a cam angle sensor for detecting the rotational position of a camshaft. A cam phase (the rotational phase of the camshaft relative to the crankshaft) is obtained based on the detection signals of the crank angle sensor and the cam angle sensor.

The crank angle sensor outputs a crank angle signal in the form of a pulse at each unit crank angle, as is well known, but it is constructed such that there is a pulse loss generated in a part of the crank angle signal, and the position of a lost or missing pulse is detected from a change in the output interval of crank angle signal pulses. Then, the cam phase is calculated from a cam angle signal pulse following a crank angle reference position signal pulse which is output as a reference position of the crank angle signal and which is detected at the first timing after the lost pulse position.

However, the phase of the camshaft with respect to the crankshaft might shift or deviate in a retard angle direction from its initial phase at the time of installation of the engine due to a secular or time-related change (expansion, wear, etc.) of the timing wrapping member. If the phase of the camshaft shifts in this manner, the opening and closing timing of intake and/or exhaust valves changes toward the retard angle direction, too, so the air fuel ratio of a mixture in each engine cylinder is adversely affected, thus posing a various kinds of problems such as generation of knocking, reduction in fuel mileage, the deterioration of exhaust emission, etc.

In conventional engine control apparatuses, it has been proposed that in order to avoid the occurrence of the problems as stated above, the state of an engine is determined by the use of the phase of a camshaft relative to a crankshaft, and upon determination of the presence of an abnormality, appropriate measures such as warning, stopping fuel supply, etc., should be taken based on an abnormality determination signal generated (see, for example, a first patent document (Japanese patent application laid-open No. 2001-164980) or a second patent document (Japanese patent application laid-open No. 2002-309994)). In the above-mentioned first patent document, when the detected phase of the camshaft exceeds an upper limit abnormality determination threshold or falls below a lower limit abnormality determination threshold, an abnormality determination signal is output so as to perform the operation of a warning device or an engine stopping device. Also, in the above-mentioned second patent document, when a selected phase of the camshaft exceeds an upper limit abnormality determination threshold, an abnormality determination signal is output so as to operate a warning device and/or an engine stopping device. In both of the above-mentioned first and second patent documents, each of the abnormality determination thresholds is defined as a reference phase (an upper limit threshold value or a lower limit threshold value) for a central value of an initial phase at the time of engine designing, which can not generate the above-mentioned problems.

In general, if there does not exist at all any factor to induce variation in control response at the time of engine installation, such as manufacturing errors of a crank angle sensor and a cam angle sensor (parts variation, mounting errors such as mounting variation, etc.), parts accuracy errors of sensor plates (form or shape tolerances, etc.), an amount of shift or deviation of the phase of the camshaft and that of the initial phase thereof in any engine coincide with the amounts of shifts or deviations of corresponding central values, respectively, at the time of engine designing, so it is possible to achieve accurate abnormality determination processing by the use of the above-mentioned abnormality determination thresholds.

However, it is not avoidable that the above-mentioned manufacturing errors exist in the actual assembly or installation of the engine, and hence the initial phase of the camshaft does not necessarily completely coincide with the initial phase of the central value thereof at the time of engine designing. As a result, in the abnormality determination processing using the above-mentioned abnormality determination thresholds, there can be a false or incorrect detection (i.e., determined as abnormal in spite of being normal) or an impossibility of detection (i.e., not determined as abnormal in spite of being abnormal) in the vicinity of the lower or upper limit abnormality determination threshold, thus making it impossible to achieve abnormality determination processing with a high degree of precision.

On the other hand, when abnormality determination processing is intended to be made with a new abnormality determination threshold being set while admitting the existence of manufacturing errors, the abnormality determination thresholds in this case should be set in the following manner. That is, the lower limit phase for a minimum initial phase in the allowed manufacturing error or tolerance is set as a lower limit abnormality determination threshold, whereas the upper limit phase for a maximum initial phase is set as an upper limit abnormality determination threshold, thus resulting in a wider range for the lower limit and the upper limit.

Accordingly, even if the abnormality determination thresholds newly set in this manner are used, there will be an impossibility of detection (not determined as abnormal though it is abnormal) in the vicinity of the abnormality determination thresholds, so it is still impossible to achieve abnormality determination processing with a high degree of precision.

Here, specific reference will be made to problems in the conventional abnormality determination processing using a first threshold setting and a second threshold setting for abnormality determination according to the above-mentioned first and second prior art patent documents while referring to FIG. 12.

FIG. 12 is a timing chart showing an abnormality determination operation at the time of a phase shift due to a secular change of the above-mentioned timing wrapping member, wherein the air fuel ratio of a mixture is deteriorated by a change in the valve opening and closing timing due to the secular change, thus representing a state in which knocking, reduction in fuel mileage, deterioration in exhaust emission or the like can be generated. In FIG. 12, the axis of abscissa corresponds to the phase (crank angle position) from a crank angle reference position. In FIG. 12, a crank angle reference position signal and a cam angle signal calculated with respect to the crank angle reference position signal are shown in association with the first and second threshold settings. In addition, the respective initial phases of engines A, B installed with their initial phases lying within a manufacturing tolerance range are also shown in association with each other.

Now, in an engine in which the initial phase of a central value at the time of engine designing is M0, when the value of the detected phase falls below a reference phase MMN of an angle more advanced than that of the initial phase M0, or when the detected phase value exceeds a reference phase MMX of an angle more retarded than that of the initial phase M0, the air fuel ratio of a mixture is deteriorated to cause the above-mentioned problems, so it should be determined that "the engine is in an abnormal state". On the other hand, since the above-mentioned problems are not caused when the detached phase is within a range from the advanced side reference phase MMN to the retarded side reference phase MMX, it should be determined that "the engine is not in an abnormal state". That is, in the engine of the initial phase (central value) M0, the advanced side reference phase MMN is set as a lower limit threshold for the first threshold setting, and the retarded side reference phase MMX is set as an upper limit threshold for the first threshold setting. At this time, the phase of the lower limit (MMN) and the phase of the upper limit (MMX) are set as the first threshold setting.

Hereinafter, an explanation will be given while taking account of the engines A, E assembled or installed normally in a factory with their initial values being set within the allowed manufacturing error or tolerance with respect to the initial phase M0 of the central value at the time of engine designing.

First of all, in case of the engine A, let us assume that the phase in which the above-mentioned problems (the deterioration of the air fuel ratio) with respect to an initial phase A0 will not be caused upon detection of the initial phase A0 is in a range between a lower limit phase AMN and an upper limit phase AMX. At this time with the engine A, they are shifted or deviated from the initial phase A0 due to a secular or time-related change of the timing wrapping member. Here, when looking at the state of the engine A, the former or earlier two phases A1, A2 exist between the lower limit phase AMN and the upper limit phase AMX and hence there is no possibility of causing the above-mentioned problems (the deterioration of the air fuel ratio), so it should be determined that "the engine A is not in an abnormal state (i.e., in a normal state)". On the other hand, the latter or later two phases A3, A4 exceed the upper limit phase AMX and can cause the above-mentioned problems (the deterioration of the air fuel ratio), so it should be determined that "the engine A is in an abnormal state".

Also, in case of the engine B, let us assume that the phase in which the above-mentioned problem (the deterioration of the air fuel ratio) with respect to an initial phase B0 will not be caused upon detection of the initial phase B0 is in a range between a lower limit phase BMN and an upper limit phase BMX. At this time, if phases B1, B2 and B3 have been detected over time with the engine B, they are shifted or deviated from the initial phase B0 due to a secular or time-related change of the timing wrapping member. Here, when looking at the state of the engine B, the former or earlier two phases B1, B2 exist between the lower limit phase BMN and the upper limit phase BMX and hence there is no possibility of causing the above-mentioned problems, so it should be determined that "the engine B is not in an abnormal state (i.e., in a normal state)". On the other hand, the latter or later phase B3 exceeds the upper limit phase BMX and can cause the above-mentioned problems, so it should be determined that "the engine B is in an abnormal state".

As described above, let us assume that the abnormality determination processing according to the above-mentioned first and second prior art documents (i.e., the abnormality determination processing on the initial phase M0 based on the first threshold setting) is performed with respect to the engines A, B which are installed with their initial phases lying within the manufacturing tolerance range for the initial phase M0 of the central value at the time of engine designing. At this time, the former or earlier phase A1 of the engine A is below the lower limit phase MMN, so it is determined that the engine is "in an abnormal state", instead of being in a "normal state" that should be determined originally or intrinsically. On the contrary, the latter or later phase A3 of the engine A does not exceed the upper limit phase MMX, so it is determined that the engine is "not in an abnormal state (in a normal state)", instead of being in an "abnormal state" that should be determined originally. In the other phases A2 and A4, there is no difference between them and the states that should be determined originally, thus posing no particular problem. On the other hand, the phase B2 of the engine B exceeds the upper limit phase MMX, so it is determined that the engine is "in an abnormal state", instead of being in a "normal state" that should be determined originally. Here, note that in the other phases B1 and B3, there is no difference between them and the states that should be determined originally, thus posing no particular problem.

Thus, since there exists the manufacturing tolerance range for the initial phase M0 of the central value at the time of engine designing, when abnormality determination processing is executed based on the first threshold setting for the initial phase M0, there can be a case where a determination different from the state that should be determined originally (i.e., determined as an abnormal state though it should be determined as not an abnormal state, or determined as not an abnormal state though it should be determined as an abnormal state), is made.

Now, reference will be made to a case in which abnormality determination processing is further executed separately by using a new second threshold setting in FIG. 12. In this case, the determination threshold is set in consideration of an initial phase within the range of a manufacturing error or tolerance permitted for the initial phase of the central value at the time of engine designing, as stated above. That is, the lower limit threshold is set to a phase value with which the above-mentioned problem can not be caused in an engine with a minimum initial phase lying in the manufacturing tolerance range among engines which are installed normally at a factory with their initial phases within the manufacturing tolerance range for the initial phase M0 of the central value at the time of engine designing. Also, the upper limit threshold is set to a phase value with which the above-mentioned problem can not be caused in an engine with a maximum initial phase lying in the manufacturing tolerance range among engines which are installed normally at a factory with their initial phases within the manufacturing tolerance range for the initial phase M0 of the central value at the time of engine designing.

In the engines A, B installed with their initial phases lying in the manufacturing tolerance range for the initial phase M0, a minimum phase among the lower limit phase MMN and the upper limit phase MMX of the respective engines A, B, i.e., the lower limit phase AMN for the initial phase A0, is set as a lower limit threshold according to the second threshold setting for the initial phase M0, whereas a maximum phase among the lower limit phase MMN and the upper limit phase MMX, i.e., the upper limit phase BMX for the initial phase B0, is set as an upper limit threshold according to the second threshold setting for the initial phase M0. When abnormality determination processing is carried out based on the second threshold setting thus set, the phase A3 in the engine A does not exceed the upper limit phase MMX, and hence instead of being determined as an "abnormal state" that should be determined originally, it is determined that the engine is "not in an abnormal state (in a normal state)". Here, note that in the other phases A1, A2 and A4, there is no difference between them and the states that should be determined originally, thus posing no particular problem. On the other hand, in case of the engine B, in the phases B1, B2 and B3, there is also no difference between them and the states that should be determined originally, thus posing no particular problem. Thus, even if the abnormality determination processing is executed based on the second threshold setting newly set, the manufacturing tolerance range is included in the second threshold setting. As a result, the threshold setting range (from the lower limit to the upper limit) is widened or increased, so there might be a case that the engine is determined to be not in an abnormal state, though it should be originally determined that the engine is in an abnormal state.

FIG. 13 is an explanatory view that illustrates the above abnormality determination results in a table, wherein the respective determination processing results based on the first and second threshold settings are shown together with the engine states (original or intrinsic states) that should be originally determined. In FIG. 13, when a determination result and a corresponding original state coincide with each other, it is represented, as the absence of difference, by "O", whereas when they do not coincide with each other, it is represented, as the presence of difference, by "X".

As will be clear from FIG. 13, when abnormality determination processing is executed on the detected phase of an engine, which is installed normally at a factory with its initial phase lying within the manufacturing tolerance range, for the initial phase of the central value at the time of engine designing by using the abnormality determination thresholds (regardless of the first or second threshold setting) as they are, there is a possibility that an abnormality determination result is output which is different from the state that should be determined originally in each individual engine, and it is impossible to achieve abnormality determination processing with a high degree of precision.

In the conventional engine control apparatuses, the abnormality determination thresholds are used for abnormality determination as they are with respect to a detected phase of an engine which has been installed normally at a factory with its initial phase lying within a manufacturing tolerance range for the central value of an initial phase at the time of engine designing. As a result, there arises the following problem. That is, when an abnormal state of the engine is determined with respect to a phase shift or deviation due to a secular change of the timing wrapping member, by using an abnormality determination threshold setting intended for only a phase shift or deviation set at the time of engine designing, there will be a possibility that a result (incorrect determination or impossible detection) different from the state that should be determined originally in each individual engine at the time of abnormality determination might be output due to the existence of manufacturing errors, thus making it impossible to achieve highly accurate abnormality determination processing.

SUMMARY OF THE INVENTION

Accordingly, the present invention is intended to solve the problems as referred to above, and has for its object to obtain an engine control apparatus which is capable of achieving abnormality determination processing with a high degree of precision.

Another object of the present invention is to obtain an engine control apparatus in which abnormality determination processing can be achieved in each individual engine, and upon detection of an abnormality determination signal, it is possible to prevent the deterioration of the air fuel ratio of a mixture by means of the operation of a warning section or a stopping section, thereby avoiding the occurrence of knocking, reduction in fuel mileage, deterioration in exhaust emission, etc.

According to one aspect of the present invention, there is provided an engine control apparatus including: a crank angle detection section that detects a crank angle of a crankshaft of an engine; a cam angle detection section that detects a cam angle of a camshaft of the engine; a valve operating mechanism that drives an intake valve and an exhaust valve of the engine; and a control unit that controls the engine based on the crank angle and the cam angle. The valve operating mechanism has a timing wrapping member wrapped between the crankshaft and the camshaft and transmits the rotation of the crankshaft to the camshaft through the timing wrapping member whereby the intake valve and the exhaust valve are driven to operate in accordance with the rotation of the camshaft. The control unit includes: a phase detection section that detects a phase of the camshaft relative to the crankshaft based on the crank angle and the cam angle; an abnormality determination section that makes a determination, based on the phase detected by the phase detection section, as to whether the valve operating mechanism is abnormal; and a threshold storage section that stores, as a lower limit threshold and an upper limit threshold, phases which become determination references of the abnormality determination section. The control unit further includes: an initial phase storage section that stores, as an initial phase, the phase detected by the phase detection section at the time of installation of the engine; and a phase correction section that corrects the phase detected by the phase detection section during operation of the engine with the use of the initial phase thereby to calculate a corrected phase. When the corrected phase deviates from a determination reference range of from the lower limit threshold to the upper limit threshold, the abnormality determination section outputs an abnormality determination signal indicative of the generation of abnormality in the timing wrapping member.

According to another aspect of the present invention, there is provided an engine control apparatus including: a crank angle detection section that detects a crank angle of a crankshaft of an engine; a cam angle detection section that detects a cam angle of a camshaft of the engine; a valve operating mechanism that drives an intake valve and an exhaust valve of the engine; and a control unit that controls the engine based on the crank angle and the cam angle. The valve operating mechanism has a timing wrapping member wrapped between the crankshaft and the camshaft, and transmits the rotation of the crankshaft to the camshaft through the timing wrapping member whereby the intake valve and the exhaust valve are driven to operate in accordance with the rotation of the camshaft. The control unit includes: a phase detection section that detects a phase of the camshaft relative to the crankshaft based on the crank angle and the cam angle; an abnormality determination section that makes a determination, based on the phase detected by the phase detection section, as to whether the valve operating mechanism is abnormal; and a threshold storage section that stores, as a lower limit threshold and an upper limit threshold, phases which become determination references of the abnormality determination section. The control unit further includes: an initial phase storage section that stores, as an initial phase, the phase detected by the phase detection section at the time of installation of the engine; a threshold correction section that calculates a correction determination reference by correcting the determination reference with the use of the initial phase; and a correction threshold storage section that stores the correction determination reference. When the phase detected by the phase detection section during operation of the engine deviates from a corrected determination reference range of from a corrected lower limit threshold to a corrected upper limit threshold based on the correction determination reference, the abnormality determination section outputs an abnormality determination signal indicative of the generation of abnormality in the timing wrapping member.

According to the present invention, it is possible to achieve highly accurate abnormality determination processing by the use of a first threshold setting set at the time of engine designing.

The above and other objects, features and advantages of the present invention will become more readily apparent to those skilled in the art from the following detailed description of preferred embodiments of the present invention taken in conjunction with the accompanying drawings.

BRIEF DESCRIPTION OF THE DRAWINGS

FIG. 7 is an explanatory view illustrating effects achieved by the first embodiment of the present invention.

FIG. 11 is a block diagram illustrating effects according to the second embodiment of the present invention.

FIG. 13 is an explanatory view illustrating false determination states in the prior art.

DESCRIPTION OF THE PREFERRED EMBODIMENTS

In the following, preferred embodiments of the present invention will be described in detail while referring to accompanying drawings.

Embodiment 1

Figure 1:
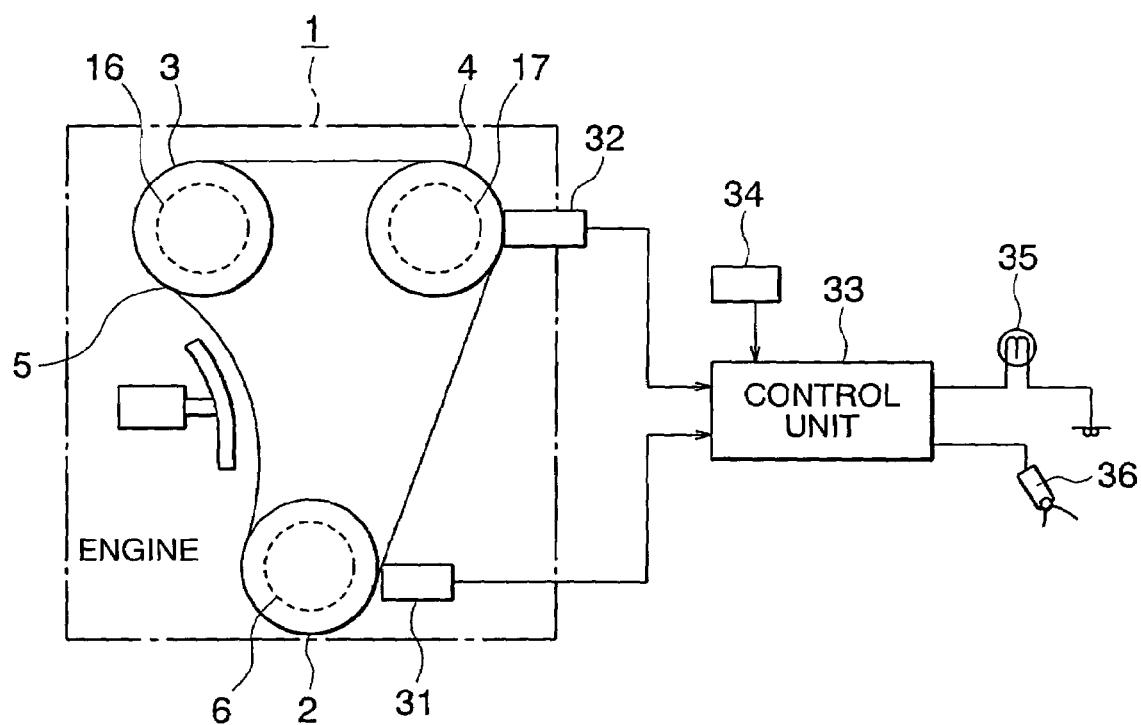
FIG. 1 is a construction view schematically showing a valve operating mechanism of an engine to which a first embodiment of the present invention is applied.

Hereinafter, reference will first be made to an engine control apparatus according to a first embodiment of the present invention with reference to the accompanying drawings. FIG. 1 is a construction view that schematically illustrates a valve operating mechanism of an engine, generally designated at 1, to which the first embodiment of the present invention is applied.

In FIG. 1, the valve operating mechanism for driving a suction or intake valve and an exhaust valve (to be described later) of the engine 1 includes a crank sprocket 2 mounted integrally on a crankshaft 6, an intake cam sprocket 3 mounted integrally on an intake camshaft 16, an exhaust cam sprocket 4 mounted integrally on an exhaust camshaft 17, and a timing wrapping member 5 wrapped around the respective sprockets 2 through 4. The timing wrapping member 5 comprises a timing belt, a timing chain or the like.

A crank angle sensor 31 for detecting the crank angle or rotation position of the crankshaft 6 is arranged at a location adjacent to the crankshaft 6. Similarly, a cam angle sensor 32 for detecting the cam angle or rotational position of the exhaust camshaft 17 is arranged at a location adjacent to the exhaust camshaft 17. The intake camshaft 16 may be arranged in an opposed relation to the cam angle sensor 32. The crank angle sensor 31 outputs a crank angle signal in the form of a pulse at each unit crank angle in accordance with an outer peripheral protrusion (not shown) of the crankshaft 6. The outer peripheral protrusion of the crankshaft 6 is constructed in a manner as to create a pulse loss in a part of the crank angle signal, as stated above. The cam angle sensor 32 is also constructed in such a manner that a cam angle signal is output at a predetermined interval in accordance with the outer peripheral protrusion (not shown) of the exhaust camshaft 17. The detection or output signals of the crank angle sensor 31 and the cam angle sensor 32 are input to the control unit 33.

The control unit 33 in the form of an electronic control unit (ECU) including a microcomputer constitutes a main body of the engine control apparatus, and it takes in detection or output signals from various kinds of sensors including the crank angle sensor 31 and the cam angle sensor 32, so that it controls various kinds of actuators in the engine 1 at appropriate control timing based on the crank angle and the cam angle thus detected.

A tester 34, being used only at the time of product inspection after or at the time of installation of the engine 1, is connected to the control unit 33. In addition, also connected, as the various kinds of actuators, to the control unit 33 are a warning light 35 for generating a warning indication when abnormality takes place in the timing wrapping member 5, an injector 36 for supplying fuel to a cylinder of the engine 1, and a spark plug (to be described later).

Figure 2:
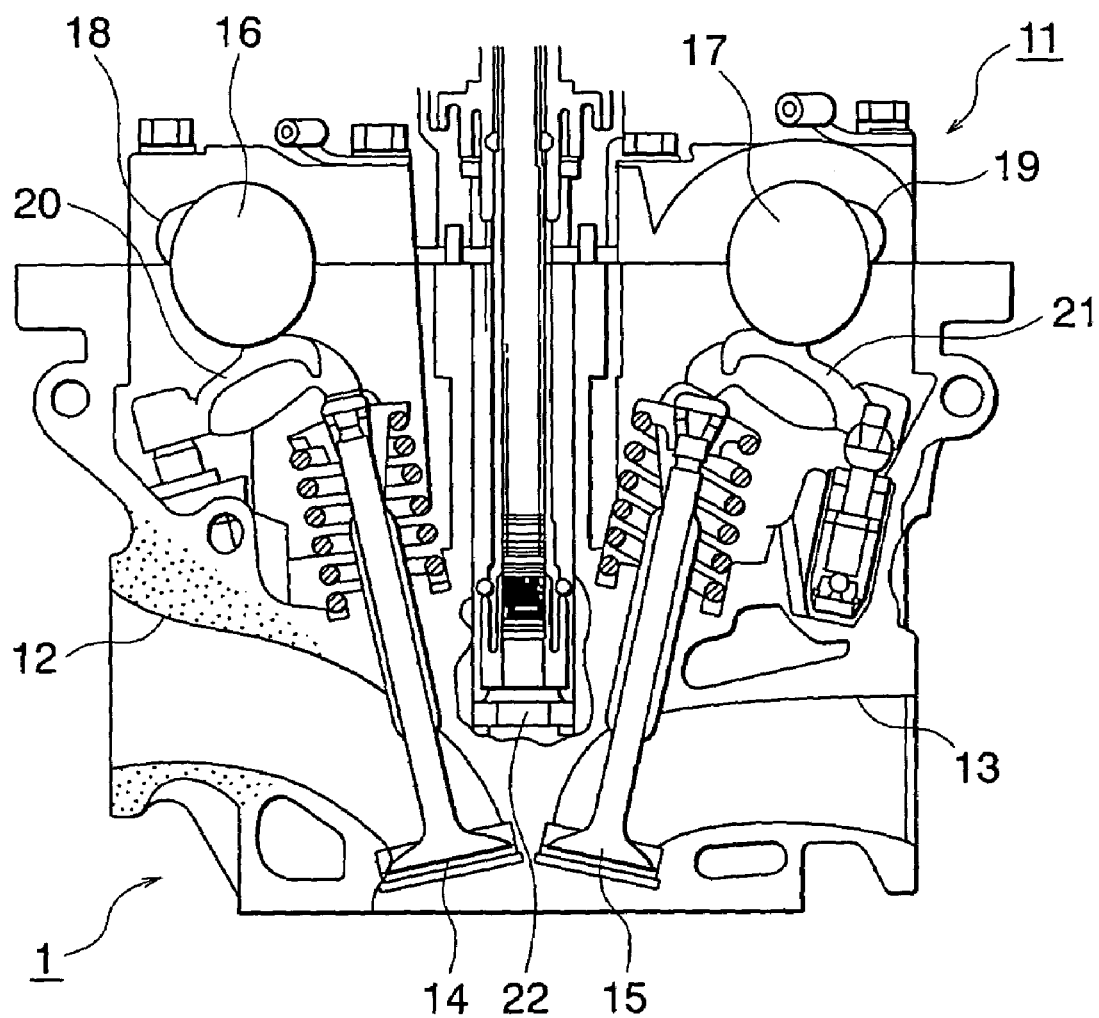
FIG. 2 is a cross sectional view showing a cylinder head part of the engine to which the first embodiment of the present invention is applied.

FIG. 2 is a cross sectional view that illustrates, on an enlarged scale, a cylinder head part 11 of the engine 1 with its component elements being shown in association with the respective camshafts 16, 17. In FIG. 2, an intake port 12 and an exhaust port 13 are formed in the cylinder head part 11 with a suction or intake valve 14 and an exhaust valve 15 being installed in the intake port 12 and the exhaust port 13, respectively. These valves 14, 15, when driven to open, serve to place a combustion chamber in a corresponding cylinder of the engine 1 to the intake port 12 and the exhaust 13, respectively.

An intake cam 18 and an exhaust cam 19 are formed on the camshafts 16, 17, respectively. Rocker arms 20, 21 for driving to open and close the valves 14, 15, respectively, are arranged in abutting engagement with the outer peripheral portions of the cams 18, 19, respectively. The spark plug 22 is arranged so as to present into the combustion chamber in a corresponding cylinder of the engine 1 for igniting an air fuel mixture therein at timing controlled by the control unit 33.

The valve operating mechanism includes the timing wrapping member 5 which extends to wrap around the crankshaft 6 and the individual camshafts 16, 17 so that the rotation of the crankshaft 6 is transmitted to the respective camshafts 16, 17 through the timing wrapping member 5 thereby to drive the intake valve 14 and the exhaust valve 15 in accordance with the rotation of the camshafts 16, 17. That is, in FIG. 1 and FIG. 2, by wrapping the timing wrapping member 5 between the crank sprocket 2 and the respective cam sprockets 3, 4, the rotational force of the crankshaft 6 is transmitted from the crank sprocket 2 to the timing wrapping member 5, and then from the timing wrapping member 5 to the intake camshaft 16 and the exhaust camshaft 17 through the sprockets 3, 4, respectively. As a result, the intake camshaft 16 and the exhaust camshaft 17 are driven to rotate whereby the cams 18, 19 formed on the camshafts 16, 17, respectively, are caused to push the rocker arms 20, 21, thereby driving the intake valve 14 and the exhaust valve 15 to open and close. In this manner, the rotational force of the crankshaft 6 is transmitted to the respective camshafts 16, 17 through the timing wrapping member 5 so that the intake valve 14 and the exhaust valve 15 are driven to open and close accurately in accordance with the rotation of the camshafts 16, 17, respectively, thus making it possible to provide an appropriate combustion cycle.

Here, reference will be made to the phase of the cam angle signal with respect to the crank angle signal while referring to a timing chart in FIG. 3.

Figure 3:
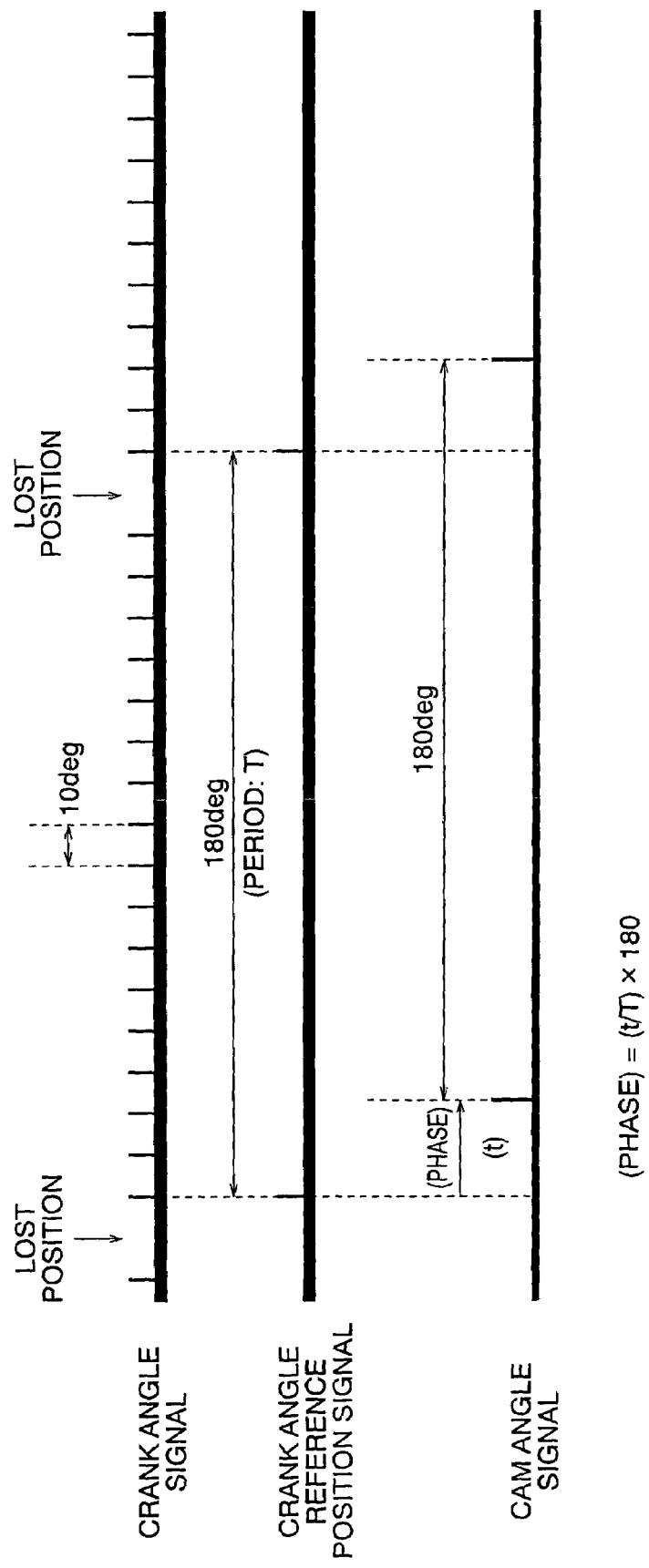
FIG. 3 is a timing chart showing a crank angle signal and a cam angle signal used in the first embodiment of the present invention.

In FIG. 3, the crank angle signal from the crank angle sensor 31 comprises a pulse generated at each unit crank angle (10 degrees) with a pulse loss occurring at an interval of 180 degrees (period T). The cam angle signal of the cam angle sensor 32 comprises a pulse generated at each crank angle of 180 degrees. A crank angle reference position signal is obtained from the lost position of the crank angle signal occurring in the period T of a crank angle of 180 degrees. A period of time t from a pulse generation time point of the crank angle reference position signal to a pulse generation time point of the cam angle signal represents the phase of the camshaft 17 with respect to the crankshaft 6.

As shown in FIG. 3, the phase (the relative time t) of the cam angle signal is obtained based on the respective detection signals from the crank angle sensor 31 and the cam angle sensor 32 in the following manner. The lost position of the crank angle signal is detected by a change in the output interval of the crank angle signal, and the phase of the exhaust camshaft 17 with respect to the crankshaft 6 is calculated from the cam angle signal detected immediately after a crank angle reference position signal pulse which is a first crank angle signal pulse after detection of the lost position. That is, the phase $\phi$ of the exhaust camshaft 17 is represented according to the following expression (1) by using the period of generation T of the crank angle reference position signal and the time t from the crank angle reference position signal to the generation of the cam angle signal.

$$\phi = (t/T) \times 180 \qquad (1)$$

However, the phases of the respective camshafts 16, 17 with respect to the crankshaft 6 shift to a retard angle direction from their initial phases at the time of engine installation owing to a secular or time-related change of the timing wrapping member 5, as previously stated, so in order to avoid the deterioration of the air fuel ratio, it becomes necessary to employ a device in the control unit 33 to compensate for a secular change of the valve opening and closing timing with respect to the combustion chamber in each cylinder of the engine 1, as will be described below.

Figure 4:
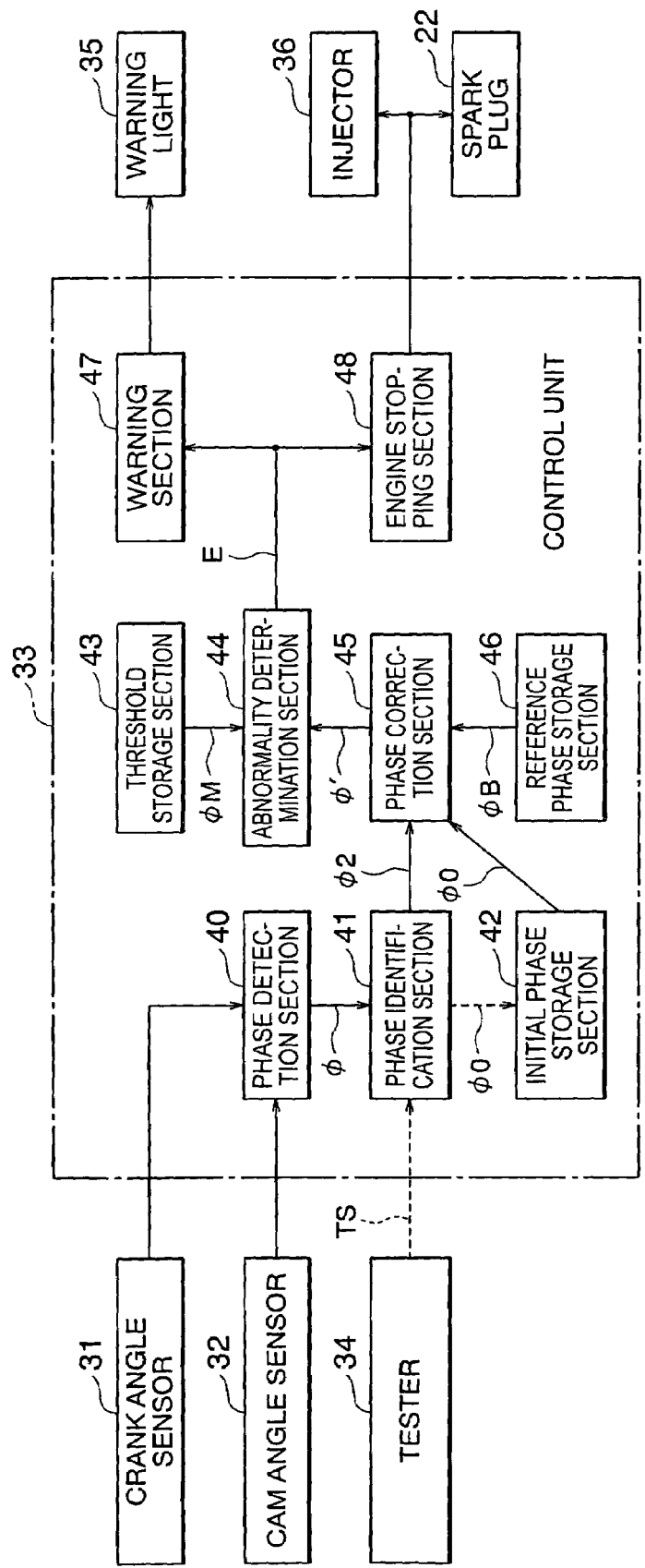
FIG. 4 is a block diagram showing the functional configuration of an engine control apparatus according to the first embodiment of the present invention.

FIG. 4 is a block diagram that shows the concrete functional configuration of the control unit 33 according to the first embodiment of the present invention. In FIG. 4, the same or like parts or elements as those described above (see FIGS. 1 and 2) are identified by the same symbols while omitting a detailed description thereof.

The control unit 33 includes a phase detection section 40, a phase identification section 41, an initial phase storage section 42, a threshold storage section 43, an abnormality determination section 44, a phase correction section 45, a reference phase storage section 46, a warning section 47, and an engine stopping section 48. In addition, though not unillustrated, the control unit 33 is further provided with a control part that controls various kinds of actuators in the engine 1 based on operating condition information from various kinds of sensors (a well-known intake air flow rate sensor, etc.). Here, note that the initial phase storage section 42 and the reference phase storage section 46 may be included in the function of the phase correction section 45, and the threshold storage section 43 may be included in the function of the abnormality determination section 44.

The phase detection section 40 detects, as a phase $\phi$, a difference between each of the rotational phases of the camshafts 16, 17 relative to the crankshaft 6 through arithmetic calculations according to the above expression (1) based on the detection signals (the crank angle and the cam angle) from the crank angle sensor 31 and the cam angle sensor 32 with the lost position of the crank angle signal being set as a reference position. The phase $\phi$ thus obtained by the phase detection section 40 is input to the phase identification section 41.

On the other hand, at the time of product inspection after the installation of the engine 1, the tester 34 is connected to the control unit 33 so that a connection signal TS from the tester 34 is input to the phase identification section 41.

When the connection signal TS from the tester 34 during the product inspection is detected, the phase identification section 41 inputs the phase φ from the phase detection section 40 to the initial phase storage section 42 as an initial phase φ0. On the other hand, at the time of normal operation in which the tester 34 is not connected, the phase identification section 41 inputs the phase φ from the phase detection section 40 to the phase correction section 45 as a normal-time detected phase value (shifted or deviated phase) φ2 during normal operation. Here, note that each of the initial phase storage section 42, the threshold storage section 43 and the reference phase storage section 46 comprises a nonvolatile memory. The initial phase storage section 42 stores the value of the initial phase φ identified by the phase identification section 41, and inputs the initial phase φ thus stored to the phase correction section 45 at the time of normal operation. The threshold storage section 43 stores the lower limit and upper limit abnormality determination thresholds set at the time of engine designing (the lower limit threshold and the upper limit threshold by the above-mentioned first threshold setting) as determination references φM.

The reference phase storage section 46 stores a correction reference phase φB set when the engine 1 is designed. Though the initial phase of a central value at the time of engine designing is used here as the correction reference phase φB, another reference phase for correction may be separately set.

The phase correction section 45 applies correction to the detected phase value (shifted or deviated phase) φ2 input from the phase detection section 40 through the phase identification section 41 by using the initial phase φ0 detected at the time of engine installation, and inputs the thus corrected phase φ' to the abnormality determination section 44. When the corrected phase φ' deviates from a range (a determination reference range from the lower limit threshold φMN to the upper limit threshold φMX) defined based on the determination reference φM, the abnormality determination section 44 outputs an abnormality determination signal E indicative of the generation of abnormality in the timing wrapping member 5 thereby to drive the warning section 47 and the engine stopping section 48.

Next, reference will be made to the phase correction processing and abnormality determination processing of the control unit 33 according to the first embodiment of the present invention, as shown in FIG. 4.

First of all, the phase correction section 45 makes a comparison in magnitude between the initial phase φ0 stored in the initial phase storage section 42 and the reference phase φB stored in the reference phase storage section 46, and calculates and stores in advance a phase deviation Δφ (=|φ0−φB|) therebetween. Here, if the initial phase φ0 exceeds the reference phase φB, the phase correction section 45 inputs a value (φ−Δφ), which is obtained by subtracting the phase deviation Δφ from a current detected phase value φ2 input through the phase identification section 41, to the abnormality determination section 44 as the corrected phase φ', whereas if the initial phase φ0 does not exceed the reference phase φB, the phase correction section 45 inputs a value (φ+Δφ), which is obtained by adding the phase deviation Δφ to the current detected phase value φ2, to the abnormality determination section 44 as the corrected phase φ'.

On the other hand, the threshold storage section 43 stores the determination reference (threshold) φM for abnormality determination set at the time of engine designing (i.e., set by the first threshold setting), and input a reference determination range set by the respective thresholds (the lower limit threshold and the upper limit threshold) to the abnormality determination section 44. By making a comparison between the phases of the abnormality determination thresholds (the lower limit threshold and the upper limit threshold) stored in the threshold storage section 43 and the corrected phase φ' acquired by the phase correction section 45, the abnormality determination section 44 determines whether the engine 1 is in an abnormal state, and outputs an abnormality determination signal E to the warning section 47 and the engine stopping section 48 when determined that the engine 1 in an abnormal state. The warning section 47 generates a warning by lighting the warning light 35 in response to the abnormality determination signal E from the abnormality determination section 44, whereby the state of the generation of abnormality resulting from a secular change is notified to the user. Here, note that a warning by a buzzer can be issued instead of the warning by the warning light. In addition, the engine stopping section 48 stops the engine 1 so as to prevent the operation thereof in a deteriorated state of the air fuel ratio by stopping the ignition of the spark plug 22 or the fuel injection of the injector 36 in response to the abnormality determination signal E from the abnormality determination section 44.

Figure 5:
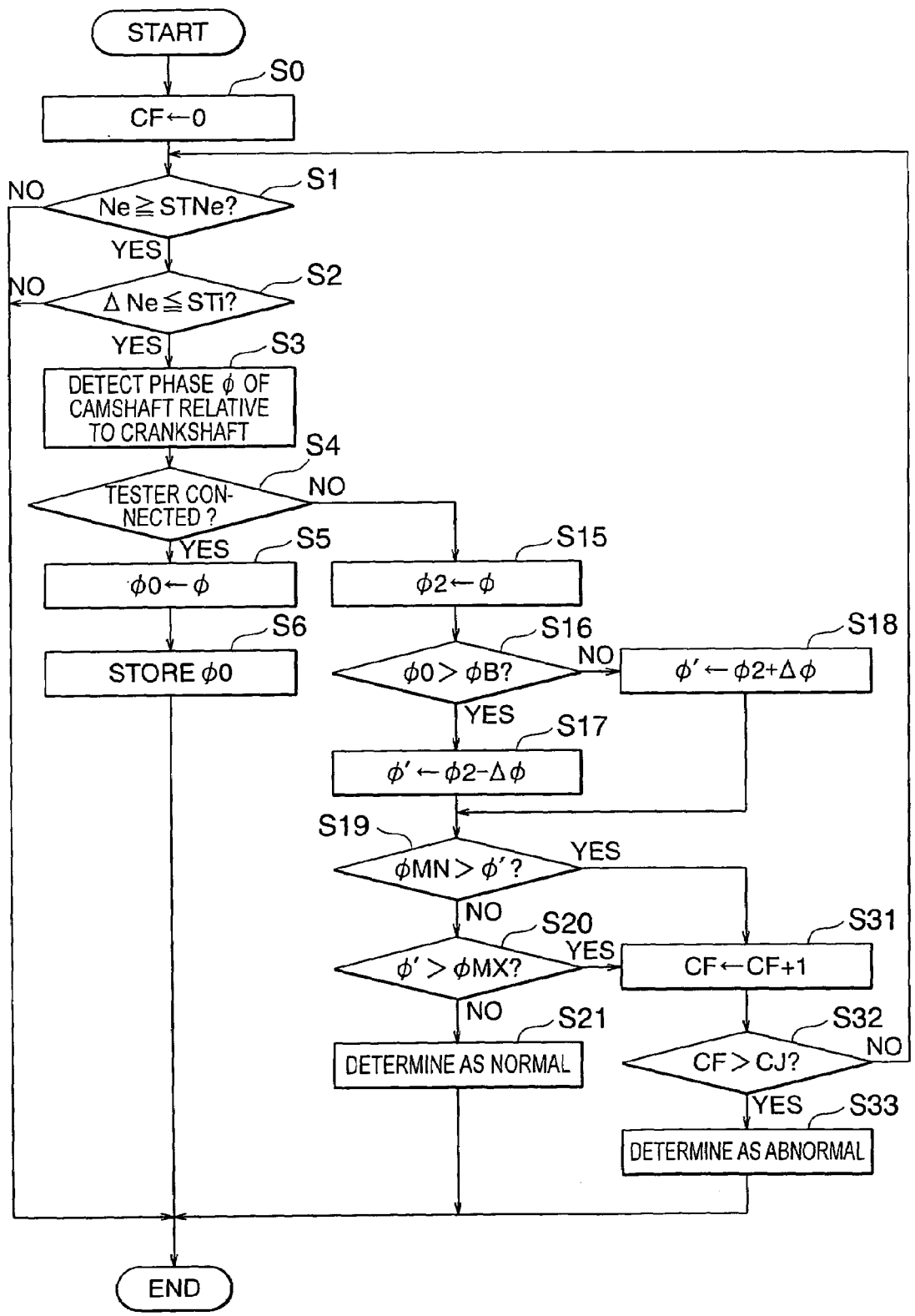
FIG. 5 is a flow chart illustrating abnormality determination processing according to the first embodiment of the present invention.

Now, reference will be made to a specific procedure for the abnormality determination processing of the control unit 33 according to the first embodiment of the present invention while referring to a flow chart in FIG. 5. In FIG. 5, individual processing steps are shown by steps S0 through S6, steps S15 through S21, and steps S31 through S33. Also, in FIG. 5. steps S1 through S3 correspond to the processing operation of the phase detection section 40 in FIG. 4; steps S4, S5 and S15 correspond to the processing operation of the phase identification section 41 in FIG. 4; and step S6 corresponds to the processing operation of the initial phase storage section 42 in FIG. 4. In addition, steps S16 through S18 correspond to the processing operation of the phase correction section 45 in FIG. 4, and steps S19 through S33 correspond to the processing operation of the abnormality determination section 44 in FIG. 4.

First of all, an abnormality determination counter CF is set to "0" as preprocessing (initialization) (step S0). Then, the number of revolutions per minute of the engine Ne is acquired based on the crank angle signal (see, for instance, FIG. 3) from the crank angle sensor 31 for comparison with a preset engine starting threshold value STNe, and it is determined whether the number of revolutions per minute of the engine Ne is equal to or greater than the engine starting threshold value STNe (step S1).

When it is determined as Ne<STNe in step S1 (that is, NO), the processing program of FIG. 5 is terminated at once, whereas when it is determined as Ne≧STNe in step S1 (that is, YES), it is assumed that the engine 1 is not in a stopped state but instead is rotating, and it is subsequently determined whether a deviation ΔNe (hereinafter referred to as a rotational deviation) between the number of revolutions per minute of the number of revolutions per minute of the engine Ne and a target number of idle revolutions per minute No is less than or equal to the stabilized idle state determination value STi (step S2). Here, the rotational deviation ΔNe between the number of revolutions per minute of the engine Ne and the target number of idle revolutions per minute No is obtained from the following expression (2).

$$\Delta Ne = |No - Ne| \qquad (2)$$

When it is determined as ΔNe>STi in step S2 (that is, NO), the processing program of FIG. 5 is terminated at once, whereas when it is determined as $\Delta Ne \leq STi$ in step S2 (that is, YES), it is assumed that the engine 1 is in a stabilized idle state, and subsequently, the time t from the generation of a crank angle reference position signal pulse to the generation of the following cam angle signal pulse as well as the period of generation T of the crank angle reference position signal are measured (see FIG. 3), and the time t from the generation of the crank angle reference position signal pulse to the generation of the following cam angle signal pulse is translated into a corresponding angle thereby detect the phase $\phi$ (step S3).

Thereafter, the presence or absence of a connection signal TS from the tester 35 is detected, and it is determined whether the tester 35 is connected to the control unit 33 (step S4). In step S4, when the connection signal TS is detected and hence a determination is made that the tester 35 is connected (that is, YES), it is assumed that the phase $\phi$ acquired in step S3 is the initial phase $\phi$ at the time of engine installation, and the phase $\phi$ acquired in step S3 is set as the initial phase $\phi 0$ (step S5). Subsequently, the initial phase $\phi 0$ is stored (step S6), and the processing program of FIG. 5 is terminated. Here, note that the respective steps S4 through S6 are the processes executed only at the time of product inspection after the engine installation. On the other hand, in step S4, when the connection signal TS is not detected and hence a determination is made that the tester 35 is not connected (that is, NO), it is assumed that the phase $\phi$ acquired in step S3 is set as a current detected phase value (shifted or deviated phase) $\phi 2$ (step S15).

Subsequently, a comparison is made between the initial phase $\phi 0$ stored in step S6 and the reference phase $\phi B$ stored beforehand in the reference phase storage section 46 so as to determine whether the relation of $\phi 0 > \phi B$ is satisfied (step S16). The reference phase $\phi B$ is a phase for correction set beforehand at the time of engine designing, and here the initial phase in the form of the central value at the time of engine designing is used as the reference phase, as stated before.

When it is determined as the initial phase $\phi 0 >$ the reference phase $\phi B$ in step S16 (that is, YES), a correction according to the following expression (3) is carried out with respect to the shifted or deviated detected phase value $\phi 2$ acquired in step S15 by using the initial phase $\phi 0$ already stored in step S6 and the reference phase $\phi B$ to acquire a corrected phase $\phi'$ (step S17), and then the control flow advances to the following determination step S19.

$$\phi' = \phi 2 - (\phi B - \phi 0) \quad (3)$$

On the other hand, when it is determined as the initial phase $\phi 0 \leq$ the reference phase $\phi B$ in step S16 (that is, NO), a correction according to the following expression (4) is carried out with respect to the detected phase value (shifted or deviated phase) $\phi 2$ acquired in step S15 by using the initial phase $\phi 0$ already stored in step S6 and the reference phase $\phi B$ to acquire a corrected phase $\phi'$ (step S18), and then the control flow advances to the following determination step S19.

$$\phi' = \phi 2 - (\phi B - \phi 0) \quad (4)$$

Next, the corrected phase $\phi'$ acquired in step S17 or step S18 is compared with the abnormality determination lower limit threshold $\phi MN$ set beforehand at the time of engine designing so as to determine whether the relation of $\phi MN > \phi'$ is satisfied (step S19). When the corrected phase $\phi'$ is less than the lower limit threshold $\phi MN$ (i.e., deviates from the determination reference range) and hence it is determined as $\phi MN > \phi'$ in step S19 (that is, YES), it is assumed that the engine 1 is in an abnormal state, and the abnormality determination counter CF is incremented (step S31), and the control flow advances to the following determination step S32.

On the other hand, when it is determined as $\phi MN \leq \phi'$ in step S19 (that is, NO), the corrected phase $\phi'$ acquired in step S17 or step S18 is then compared with the abnormality determination upper limit threshold $\phi MX$ set beforehand at the time of engine designing so as to determine whether the relation of $\phi' > \phi MX$ is satisfied (step S20). When the corrected phase $\phi'$ exceeds the upper limit threshold $\phi MX$ (i.e., deviates from the determination reference range) and hence it is determined as $\phi' > \phi MX$ in step S20 (that is, YES), it is assumed that the engine 1 is in an abnormal state, and the abnormality determination counter CF is incremented (step S31), and the control flow advances to the following determination step S32. On the other hand, when it is determined as $\phi' \leq \phi MX$ in step S20 (that is, NO), a determination is made that the engine 1 is not in an abnormal state (i.e., in a normal state) (step S21), and the processing program of FIG. 5 is terminated.

On the other hand, in step S32, the value of the abnormality determination counter CF incremented by the step S31 is compared with an abnormality determination counter threshold CJ set beforehand at the time of engine designing so as to determine whether the relation of CF>CJ is satisfied. When it is determined as CF>CJ in step S32 (that is, YES), a final determination is made that the engine 1 is in an abnormal state, and an abnormality determination signal E is output (step S33), terminating the processing program of FIG. 5, whereas when it is determined as CF$\leq$CJ in step S32 (that is, NO), a return is carried out to step S1 where the above-mentioned processing operations are performed in a repeated manner.

Figure 6:
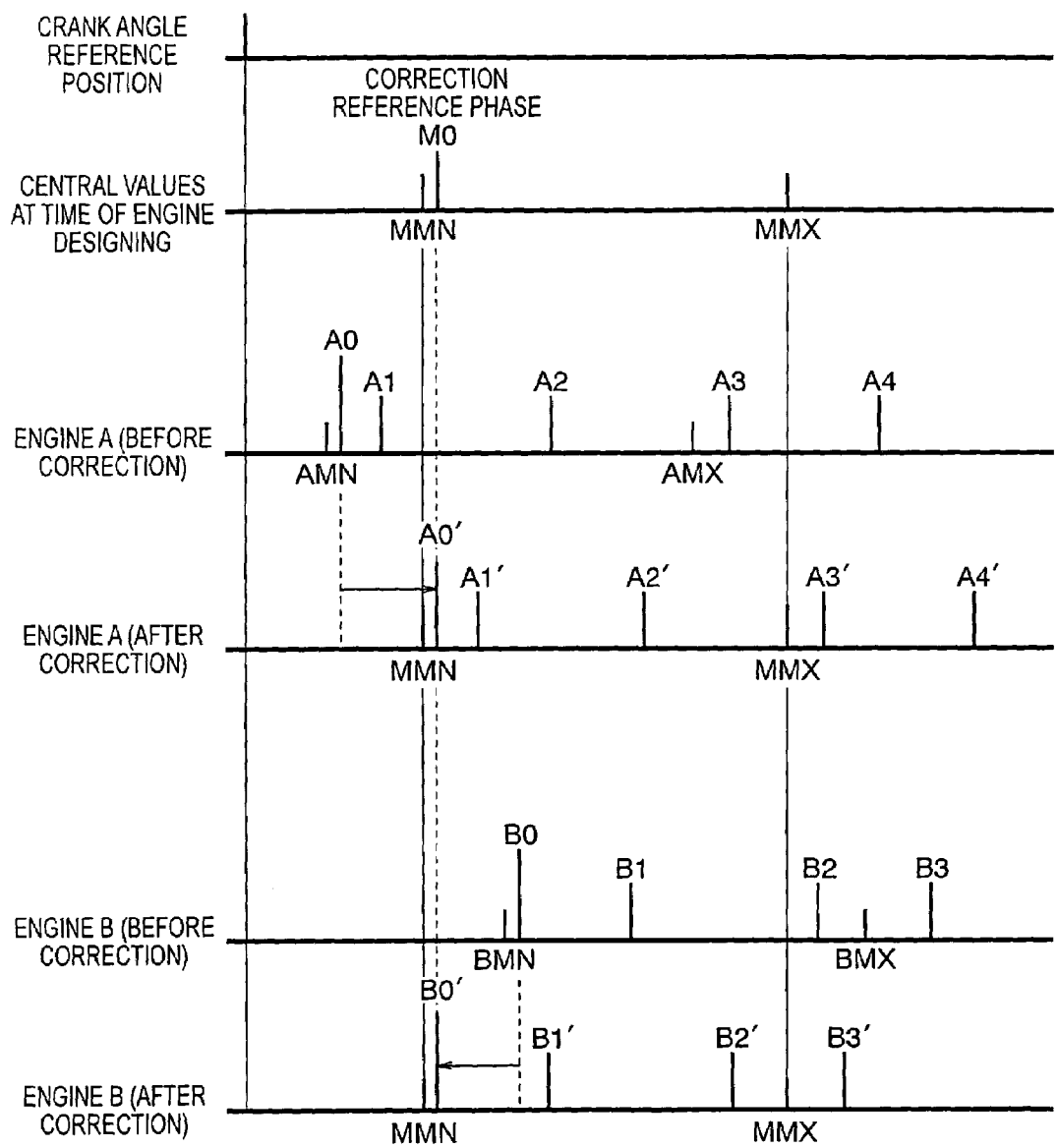
FIG. 6 is a timing chart for explaining phase correction processing according to the first embodiment of the present invention.
Figure 12:
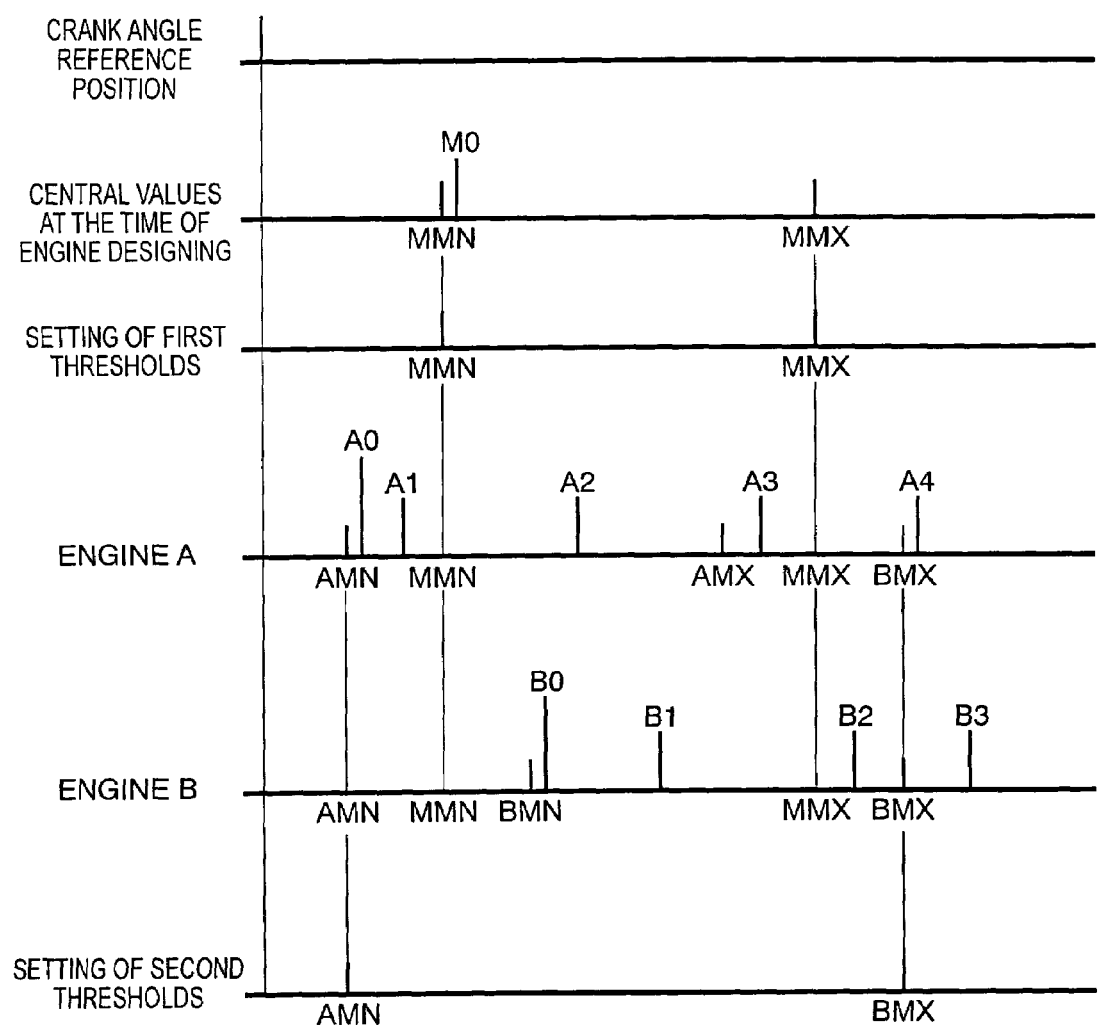
FIG. 12 is a timing chart for explaining a false determination processing operation in the prior art.

Next, a more specific explanation will be given to the processing operations according to the first embodiment of the present invention by taking as an example a case of using the same data as the above-mentioned one (see FIG. 12) while referring to a timing chart in FIG. 6 together with FIG. 1 through FIG. 5. Here, note that the initial phase of the central value at the time of engine designing is used as the reference phase $\phi B$, as previously stated. In FIG. 6, the data before correction and the result of the data after correction on which the above-mentioned correction processing is carried out are shown while coordinating them with the crank angle reference position. Here, an initial phase A0 in FIG. 6 corresponds to the above-mentioned (see FIGS. 4 and 5) initial phase $\phi 0$; a reference phase M0 in FIG. 6 corresponds to the reference phase $\phi B$; and phases A1 through A4 in FIG. 6 correspond to the shifted or deviated detected phase value $\phi 2$. Also, an abnormality determination lower limit threshold MMN and an abnormality determination upper limit threshold MMX in FIG. 6 correspond to the lower limit threshold $\phi MN$ and the upper limit threshold $\phi MX$, respectively.

In FIG. 6, the initial phase A0 of the engine A does not exceed the reference phase M0, so the control flow proceeds to step S18 as a result of the determination (that is, NO) in step S16 in FIG. 5. At this time, the respective before-correction phases A1 through A4 of the engine A are added by a deviation (M0−A0) between the reference phase M0 and the initial phase A0 to be corrected to after-correction phases A1' through A4', respectively. Also, the before-correction initial phase A0 is corrected to an after-correction initial phase A0' by performing the same processing as described above. The after-correction phases A0' through A4' thus obtained are shown just below a before-correction phase chart. Hereinafter, by executing the determination steps S19 and S20 in FIG. 5 for the after-correction phases A1' through A4', abnormality determination processing is executed by application of a first threshold setting according to the lower limit threshold MMN and the upper limit threshold MMX.

With respect to engine B, correction processing similar to that in case of engine A is executed for before-correction data thereof to provide after-correction data, as shown in FIG. 6. Here, an initial phase B0 in FIG. 6 corresponds to the above-mentioned (see FIGS. 4 and 5) initial phase φ0, and phases B1 through B3 in FIG. 6 correspond to the shifted or deviated detected phase value φ2.

In FIG. 6, the initial phase B0 of the engine B exceeds the reference phase M0, so the control flow proceeds to step S17 as a result of the determination (that is, YES) in step S16 in FIG. 5. At this time, the respective before-correction phases B1 through B3 of the engine B are subtracted by a deviation (B0−M0) between the reference phase M0 and the initial phase B0 to be corrected to after-correction phases B1' through B3', respectively. Also, the before-correction initial phase B0 is corrected to an after-correction initial phase B0' by performing the same processing as described above. The after-correction phases B0' through B3' thus obtained are shown just below a before-correction phase chart. Hereinafter, by executing the determination steps S19 and S20 in FIG. 5 for the after-correction phases B1' through B3', abnormality determination processing is executed by application of a first threshold setting according to the lower limit threshold MMN and the upper limit threshold MMX.

FIG. 7 is an explanatory view that illustrates the above-mentioned abnormality determination results in a table, in which there are shown the results obtained by executing the abnormality determination processing with the use of the above-mentioned (see FIG. 12) first threshold setting (the lower limit MMN and the upper limit MMX) for the after-correction phases of the respective engines A and B. In FIG. 7, signs "O" and "X" for the presence and absence, respectively, of a difference are similar to the above-mentioned ones (see FIG. 13).

As will be clear from FIG. 7, it is found that accurate abnormality determination results can be obtained corresponding to the states that should be originally or basically determined with respect to all the phases of the respective engines A and B. In addition, since the after-correction initial phases A0' and B0' are detected at the position of the reference phase M0, as shown in FIG. 6, it can be assumed that the after-correction phases A1' through A4' and B1' through B3' are "shifted or deviated phases" with respect to the reference phase M0, so accurate abnormality determination processing can be executed by using the first threshold setting (the lower limit MMN and the upper limit MMX).

As shown in FIG. 1 through FIG. 6, the engine control apparatus according to the first embodiment of the present invention includes the valve operating mechanism that serves to transmit the rotation of the crankshaft 6 to the camshafts 16, 17 through the timing wrapping member 5, which is wrapped between the crank sprocket 2 on the crankshaft 6 and the cam sprockets 3, 4 on the camshafts 16, 17, whereby the intake valve 14 and the exhaust valve 15 are driven in accordance with the rotation of the camshafts 16, 17. In addition, the control unit 33 of the engine 1 includes the phase detection section 40 that detects the phase φ of the camshafts 16, 17 based on the crank angle of the crankshaft 6 and the cam angle of the camshafts 16, 17 detected by the crank angle sensor 31 and the cam angle sensor 32, respectively, the abnormality determination section 44 that outputs an abnormality determination signal E when the phase φ deviates from the determination reference range of from the lower limit threshold φMN to the upper limit threshold φMX, and the phase correction section 45 that corrects the phase φ by using the initial phase φ0 at the time of installation of the engine 1.

Thus, according to the first embodiment of the present invention, when a phase shift or deviation is generated due to a secular change of the valve operating mechanism, it is possible to collect all the initial phases φ to the position of the reference phase φB by applying correction to the detected phases φ with the use of the initial phases φ0 and the reference phase φB, and all the phases are corrected as "shifted or deviated phases (corrected phases φ')" with respect to the reference phase φB. As a result, when abnormality determination processing is executed in the individual engines A and B, there is no need to take account of the existence of their individual product errors, so only a phase shift or deviation due to a secular change can be made a target to be determined. Accordingly, it is possible to achieve highly accurate abnormality determination processing by the use of the first threshold setting set at the time of engine designing.

As described above, the engine control apparatus according to the first embodiment of the present invention includes the crank angle sensor 31 that detects the crank angle of the crankshaft 6 of the engine 1, the cam angle sensor 32 that detects the cam angle of the camshafts 16, 17 of the engine 1, the valve operating mechanism that drives the intake valve 14 and the exhaust valve 15 of the engine 1, and the control unit 33 that controls the engine 1 based on the crank angle and the cam angle thus detected.

The valve operating mechanism includes the timing wrapping member that extends to wrap around the crankshaft 6 and the individual camshafts 16, 17 so that the rotation of the crankshaft 6 is transmitted to the respective camshafts 16, 17 through the timing wrapping member 5 thereby to drive the intake valve 14 and the exhaust valve 15 in accordance with the rotation of the camshafts 16, 17.

The control unit 33 includes the phase detection section 40 that detects the phase φ of a camshaft (the exhaust camshaft 17) relative to the crankshaft 6 based on the crank angle and the cam angle, the abnormality determination section 44 that makes a determination, based on the phase φ detected by the phase detection section 40, as to whether the valve operating mechanism is abnormal, the threshold storage section 43 that stores, as the lower limit threshold φMN and the upper limit threshold φMX, phases which become the determination references φM of the abnormality determination section 44, the initial phase storage section 42 that stores, as the initial phase φ0, the phase φ detected by the phase detection section 40 at the time of installation of the engine 1, and the phase correction section 45 that corrects the phase φ detected by the phase detection section 40 during operation of the engine 1 with the use of the initial phase φ0 thereby to calculate the corrected phase φ'.

When the corrected phase φ' deviates from the determination reference range of from the lower limit threshold φMN to the upper limit threshold φMX, the abnormality determination section 44 outputs an abnormality determination signal E indicative of the generation of abnormality in the timing wrapping member 5, whereby a phase deviation of the camshafts 16, 17 relative to the crankshaft generated due to a secular change (expansion, wear, etc.) in the timing wrapping member 5 can be detected, and the state of the engine 1 can be determined from the corrected phase φ' upon generation of the deviation, thus making it possible to achieve abnormality determination processing with high accuracy.

Moreover, the control unit 33 includes the phase identification section 41 to which the tester 34 is connected only at the time of installation of the engine 1. The phase identification section 41 inputs the phase φ detected by the phase detection section 40 to the initial phase storage section 42 as an initial phase φ0 when a connection signal TS from the tester 34 during product inspection is detected, and inputs the phase φ detected by the phase detection section 40 to the phase correction section 45 as a detected phase value φ2 when a connection signal TS from the tester 34 is not input. The phase correction section 45 inputs the corrected phase φ' based on the detected phase value φ2 to the abnormality determination section 44. As a result, it is possible to achieve highly accurate abnormality determination processing.

Further, provision is made for the warning light 35 that serves to provide a warning indication upon occurrence of an abnormality in the timing wrapping member 5, and the control unit 33 includes the warning section 47 that drives the warning light 35 in response to the abnormality determination signal E. Also, provision is made for the injector 36 and the spark plug 22 of the engine 1 that are adapted to be driven by the control unit 33, and the control unit 33 includes the engine stopping section 48 that serves to stop at least one of the injector 36 and the spark plug 22 in response to the abnormality determination signal E. With such an arrangement, it is possible to achieve abnormality determination processing with high precision in individual engines. In addition, when it is determined that the timing wrapping member 5 is abnormal, the warning light 35 is driven to light in response to an output of the abnormality determination signal E, so that the abnormal state of the timing wrapping member 5 can be notified to an operator, thus prompting him or her to take an appropriate abnormality countermeasure. Moreover, by performing such a countermeasure as stopping the fuel supply from the injector 36 or stopping the driving of the spark plug 22, it is possible to stop the operation of the engine 1 with the timing wrapping member 5 being in an abnormal state. That is, when the abnormality determination signal E is output, the deterioration of the air fuel ratio in the engine 1 can be prevented by the processing operation of the warning section 47 or the engine stopping section 48, whereby the occurrence of knocking, reduction in fuel mileage, the deterioration of the exhaust emission, etc., can be avoided in a reliable manner.

Embodiment 2

Figure 8:
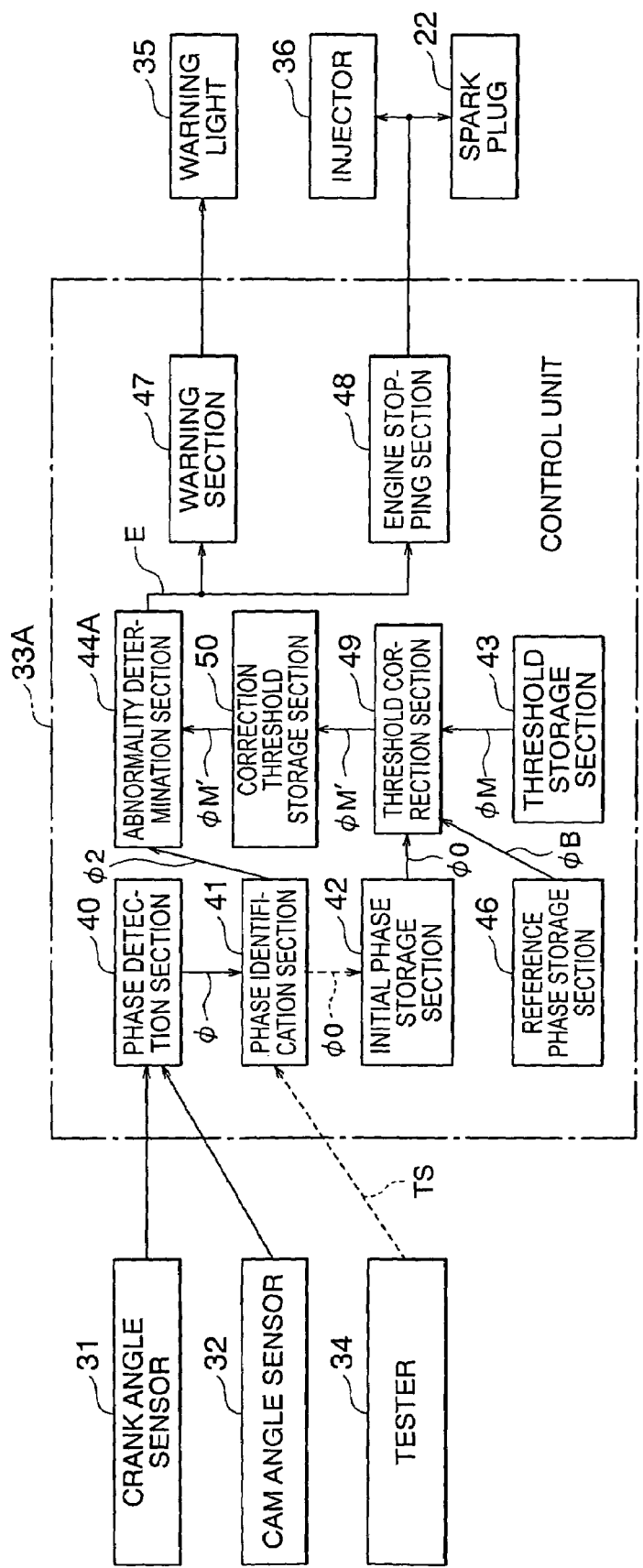
FIG. 8 is a block diagram showing the functional configuration of an engine control apparatus according to a second embodiment of the present invention.

Although in the above-mentioned first embodiment (see FIG. 4), the phase correction section 45 is arranged in the control unit 33, provision can instead be made for a threshold correction section 49, as shown in FIG. 8. FIG. 8 is a block diagram that illustrates an engine control apparatus according to a second embodiment of the present invention, wherein the same parts or components as those described above (see FIG. 4) are identified by the same symbols or by the same symbols with "A" affixed to their ends, while omitting a detailed explanation thereof. Here, note that the hardware configuration according to the second embodiment of the present invention is identical with the above-mentioned one (see FIGS. 1 and 2).

In FIG. 8, a control unit 33A includes, in addition to a phase detection section 40, a phase identification section 41, an initial phase storage section 42, a threshold storage section 43, an abnormality determination section 44A, a reference phase storage section 46, a warning section 47 and an engine stopping section 48, a threshold correction section 49 that corrects the determination reference φM of the abnormality determination section 44A, and a corrected threshold storage section 50 that stores a corrected determination reference φM' (corrected threshold).

Similarly as described above, the initial phase storage section 42, the threshold storage section 43, the reference phase storage section 46 and the correction threshold storage section 50 may be included in the function of the threshold correction section 49. In addition, the threshold correction section 49 may be included in the functions of the initial phase storage section 42, the threshold storage section 43 and the reference phase storage section 46, and the correction threshold storage section 50 may be included in the function of the abnormality determination section 44A.

The initial phase storage section 42 stores the phase φ of the respective camshafts 16, 17 with respect to the crankshaft 6 detected at the time of engine installation as an initial phase φ0. The threshold correction section 49 corrects the determination reference φM (a lower limit threshold φMN and an upper limit threshold φMX) by using the initial phase φ0, calculates the corrected determination reference φM' (a corrected lower limit threshold φMN' and a corrected upper limit threshold φMX') and stores it in the correction threshold storage section 50. When the corrected phase value φ2 input from the phase determination section 41 deviates from a range (a region from the lower limit threshold φMN to the upper limit threshold φMX) defined based on the corrected determination reference φM' that is corrected by the threshold correction section 49 and stored in the correction threshold storage section 50, the abnormality determination section 44A outputs an abnormality determination signal E indicative of the generation of abnormality in the timing wrapping member 5 thereby to drive the warning section 47 and the engine stopping section 48.

In a product inspection at the time of engine installation, a tester 34 is connected to the control unit 33A as stated above, and the phase identification section 41 inputs the phase φ acquired by the phase detection section 40 upon detection of a connection signal TS to the initial phase storage section 42 as an initial phase φ0, but at other times, it inputs the phase φ acquired by the phase detection section 40 to the abnormality determination section 44A as a detected phase value φ2.

The initial phase storage section 42 stores the initial phase φ0 identified by the phase identification section 41 at the time of product inspection. Also, the threshold storage section 43 stores in advance the determination reference φM set at the time of designing the engine 1 (the lower limit threshold φMN and the upper limit threshold φMX according to the above-mentioned first threshold setting). The reference phase storage section 46 stores in advance a reference phase φB set when the engine 1 is designed.

Further, the threshold correction section 49 applies a correction to the determination reference φM stored in the threshold storage section 43 in the following manner. First of all, a comparison is made between the initial phase φ0 stored in the initial phase storage section 42 and the reference phase φB stored in the reference phase storage section 46 thereby to calculate a phase deviation $\Delta\phi$ ($=|\phi0-\phi B|$) therebetween. If the reference phase φB exceeds the initial phase φ0, the phase deviation Δφ is subtracted from the determination reference φM (the lower limit threshold φMN and the upper limit threshold φMX of the abnormality determination threshold) stored in the threshold storage section 43 to provide the corrected determination reference φM' (the corrected lower limit threshold φMN' and the corrected upper limit threshold φMX'). On the other hand, if the reference phase φB does not exceed the initial phase φ0, the phase deviation Δφ is added to the determination reference φM (the lower limit threshold φMN' and the upper limit threshold φMX' for abnormality determination) stored in the threshold storage section 43 to provide the corrected determination reference φM' (the corrected lower limit threshold φMN' and the corrected upper limit threshold φMX'). The corrected determination reference φM' thus corrected is stored in the correction threshold storage section 50.

The correction threshold storage section 50 comprises a nonvolatile memory, and the lower limit threshold φMN and the upper limit threshold φMX of the abnormality determination threshold already stored in the threshold storage section 43 are updated and then stored by being overwritten by the corrected determination reference φM' (the corrected lower limit threshold φ MN' and the corrected upper limit threshold φMX') corrected by the threshold correction section 49.

Hereinafter, the abnormality determination section 44A makes a comparison between the detected phase value φ2 from the phase identification section 41 and the correction determination reference φM' (the corrected abnormality determination lower limit threshold φMN' and the corrected upper limit threshold φMN') stored in the correction threshold storage section 50 thereby to determine whether the timing wrapping member 5 of the engine 1 is in an abnormal state, and outputs an abnormality determination signal E when it is determined that the timing wrapping member 5 is in an abnormal state. Note that the processing operations of the warning section 45 and the engine stopping section 46 based on the abnormality determination signal E from the abnormality determination section 44A are similar to the above-mentioned ones and hence an explanation thereof is omitted here.

Figure 9:
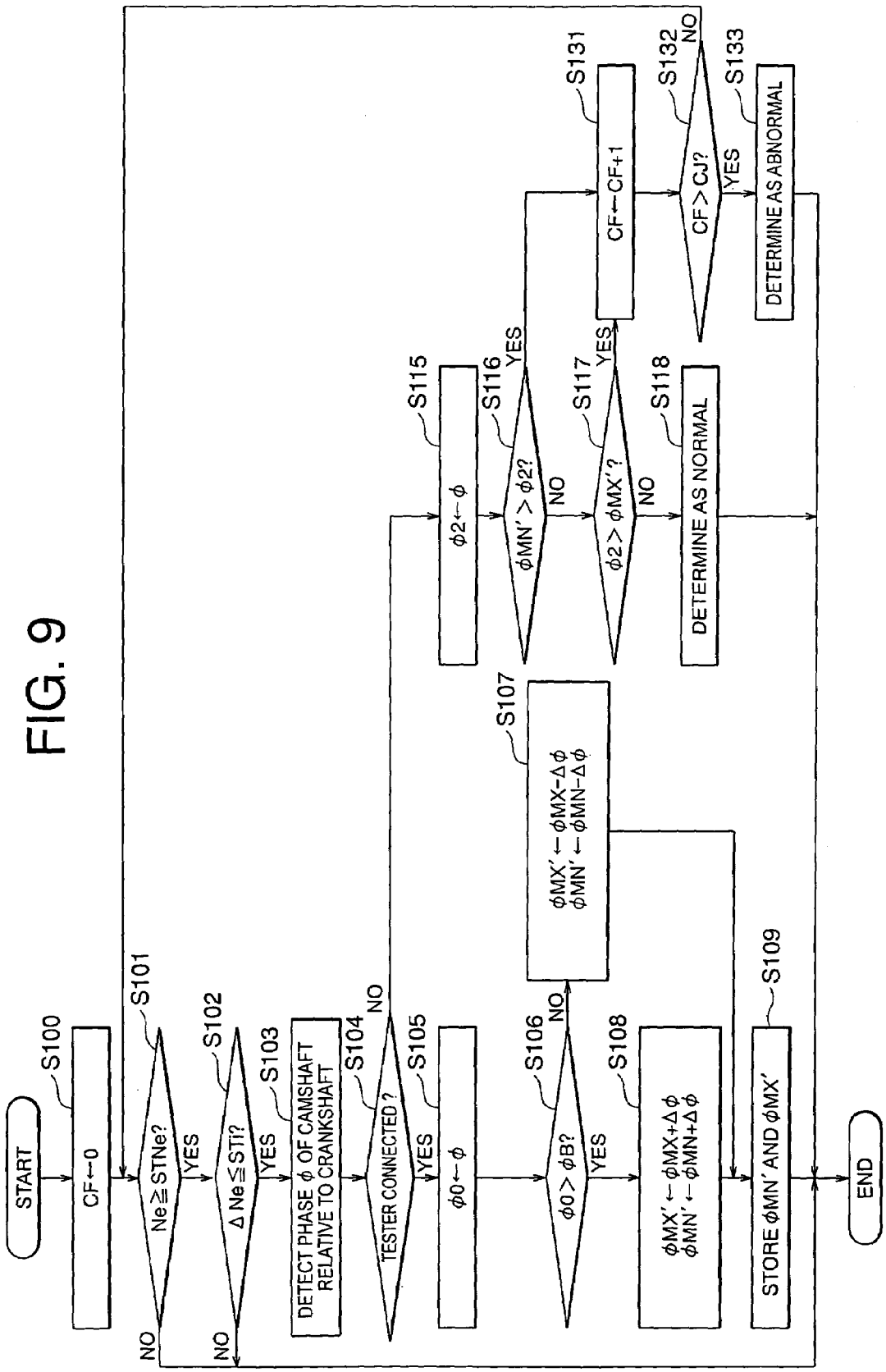
FIG. 9 is a flow chart illustrating abnormality determination processing according to the second embodiment of the present invention.

Now, reference will be made to a specific procedure for the abnormality determination processing of the control unit 33A according to the second embodiment of the present invention while referring to a flow chart in FIG. 9. In FIG. 9, individual processing steps are shown by steps S100 through S109, steps S115 through S118, and steps S131 through S133. Steps S100 through S105, S115, S118, and S131 through S133 are similar to the above-mentioned (see FIG. 5) steps S0 through S5, S15, S18, and S31–S33, respectively. In addition, in FIG. 9, step S103 corresponds to the processing operation of the phase detection section 40, and steps S104 and S105 correspond to the processing operation of the phase identification section 41. In this case, step S105 corresponds to the processing operation of the initial phase storage section 42. Also, steps S106 through S108 correspond to the processing operation of the threshold correction section 49 in FIG. 8; step S109 corresponds to the processing operation of the correction threshold value storage section 50 in FIG. 8; and steps S116 through S133 correspond to the processing operation of the abnormality determination section 44A in FIG. 8.

First of all, the abnormality determination counter CF is initialized to "0" (step S100), and a comparison is made between the number of revolutions per minute of the engine Ne and the engine starting threshold value STNe acquired from the crank angle signal so as to determine whether the number of revolutions per minute of the engine Ne is greater than or equal to the engine starting threshold value STNe (step S101).

When it is determined as Ne≧STNe in step S101 (that is, YES), it is assume that the engine 1 is rotating (i.e., not in a stopped state) and the control flow advances to the following determination step S102, whereas when it is determined as Ne<STNe (that is, NO), the processing program of FIG. 9 is terminated.

In step S102, when a deviation in the number of revolutions per minute ΔNe (=|No−Ne|) between the number of revolutions per minute of the engine Ne and the target number of idle revolutions per minute No is less than or equal to the stabilized idle state determination value STi (that is, YES), it is assumed that the engine 1 is in a stabilized idle state, and the control flow proceeds to step S103, whereas when it is determined as ΔNe>STi (that is, NO), it is assumed that the engine 1 is not in a stabilized idle state, and the processing program of FIG. 9 is terminated.

In step S103, the phase detection section 40 measures a time t from a crank angle reference position signal pulse to the generation of the following cam angle signal pulse as well as a period of generation T of the crank angle reference position signal on the basis of the crank angle signal and the cam angle signal, and converts the time t into a corresponding angle thereby to detect the phase φ of the exhaust camshaft 17 with respect to the crankshaft 6.

Subsequently, the phase identification section 41 determines, based on the presence or absence of a connection signal TS, whether the tester 35 is connected to the control unit 33A (step S104), and when it is determined that a connection signal TS is not detected (that is, NO), the control flow proceeds to step S115, whereas when it is determined in step S4 that a connection signal TS is detected (that is, YES), it is assumed that the phase φ acquired in step S103 is the initial phase at the time of engine installation, and the phase φ acquired in step S103 is set as an initial phase φ0 (step S105).

Thereafter, the threshold correction section 49 makes a comparison between the initial phase φ0 acquired in step S105 and the reference phase φB (step S106), and when it is determined as φ0≦φB (that is, NO), the control flow proceeds to step S107, whereas when it is determined as φ0>φB (that is, YES), the control flow proceeds to step S108.

In step S107, the threshold correction section 49 calculates a corrected lower limit threshold φMN' and a corrected upper limit threshold φMX' by applying corrections according to the following expressions (5) and (6) to the lower limit threshold φMN and the upper limit threshold φMX set beforehand at the time of engine designing by using the initial phase φ0 and the reference phase φB acquired in step S105, and then the control flow proceeds to step S109.

$$\phi MX' = \phi MX - (\phi B - \phi 0) \tag{5}$$

$$\phi MN' = \phi MN - (\phi B - \phi 0) \tag{6}$$

On the other hand, in step S108, the threshold correction section 49 calculates a corrected lower limit threshold φMN' and a corrected upper limit threshold φMX' by applying corrections according to the following expressions (7) and (8) to the abnormality determination lower limit threshold φMN and the abnormality determination upper limit threshold φMX by using the initial phase φ0 and the reference phase φB, and then the control flow proceeds to step S109.

$$\phi MX' = \phi MX + (\phi 0 - \phi B) \tag{7}$$

$$\phi MN' = \phi MN + (\phi 0 - \phi B) \tag{8}$$

In step S109, the correction threshold storage section 50 stores the corrected lower limit threshold φMN' and the corrected upper limit threshold φMX' acquired in step S107 or step S108, and the processing program of FIG. 9 is then terminated. Here, note that the steps S105 through S109 are the processes executed only at the time of product inspection after the engine installation.

In step S115, the phase identification section 41 sets the phase φ acquired in step S103 as a shifted or deviated phase detection value φ2, and the control flow proceeds to step S116.

In step S116, the abnormality determination section 44A makes a comparison between the detected phase value φ2 acquired in step S115 and the corrected lower limit threshold φMN' stored in step S109 thereby to determine whether the detected phase value φ2 is below the corrected lower limit threshold φMN'.

When it is determined as φMN'>φ2 in step S116 (that is, YES), it is assumed that the engine 1 is in an abnormal state and the abnormality determination counter CF is incremented, and then in step S131, the count value of the abnormality determination counter CF is compared with an abnormality determination counter threshold CJ so as to determine whether the relation of CF>CJ is satisfied (step S132).

When it is determined as CF>CJ in step S132 (that is, YES), a final determination is made that the engine 1 is in an abnormal state, and an abnormality determination signal E is output (step S133), terminating the processing program of FIG. 9, whereas when it is determined as CF≦CJ in step S132 (that is, NO), a return is carried out to step S101 where the above-mentioned processing operations are performed in a repeated manner.

On the other hand, when it is determined as φMN'≦φ2 in step S116 (that is, NO), a comparison is then made between the detected phase value φ2 acquired in step S115 and the corrected upper limit threshold φMX' stored in step S109 thereby to determine whether the detected phase value φ2 is above the corrected upper limit threshold φMX' (step S117).

When it is determined as φ2>φMX' in step S117 (that is, YES), it is assumed that the engine 1 is in an abnormal state and the control flow proceeds to step S131, whereas when it is determined as φ2≦φMX' (that is, NO), it is finally determined that the engine 1 is not in an abnormal state (i.e., in a normal state) (step S118), and the processing program of FIG. 9 is terminated.

Figure 10:
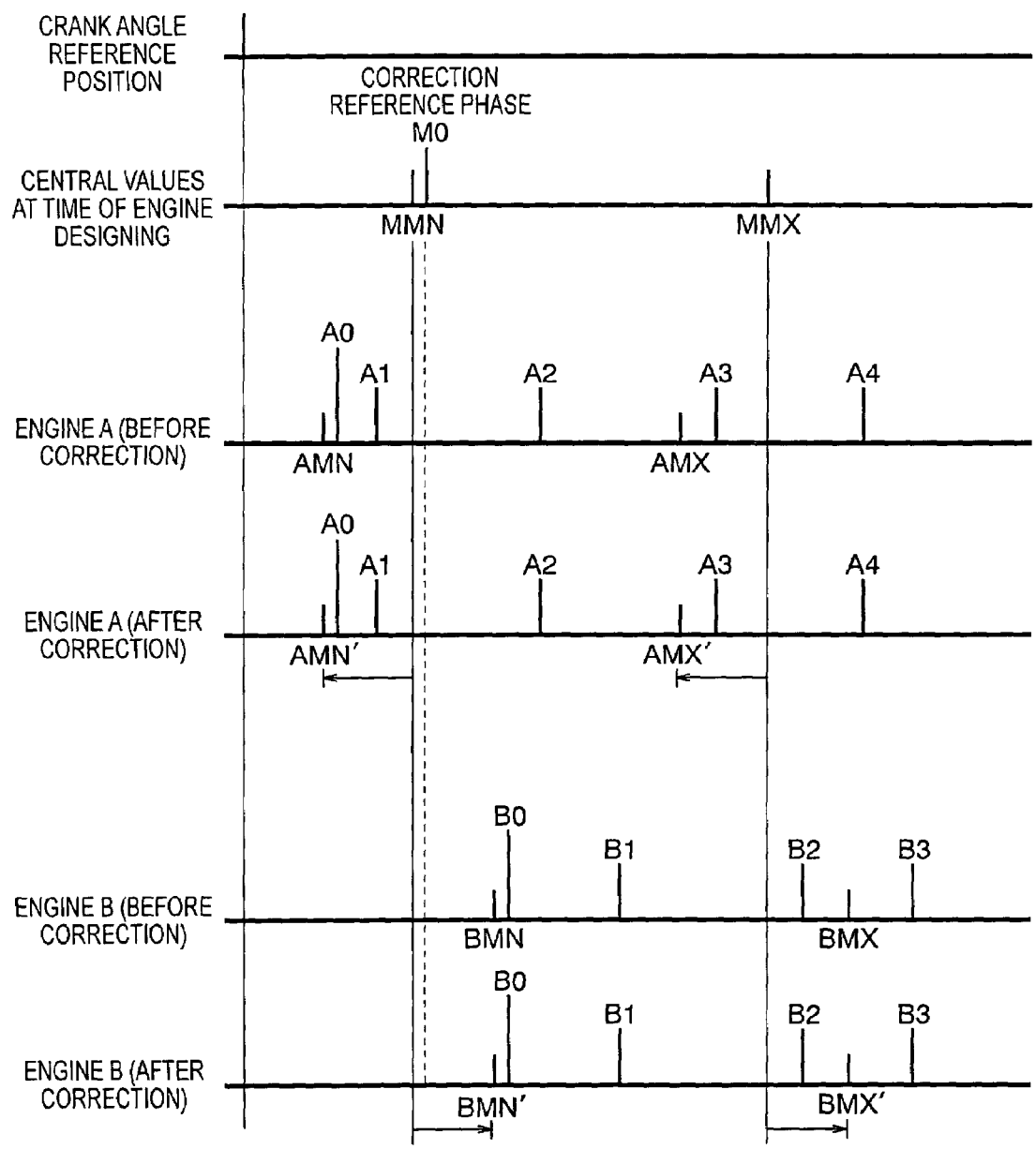
FIG. 10 is a timing chart for explaining threshold correction processing according to the second embodiment of the present invention.

Next, a more specific explanation will be given to the processing operations according to the second embodiment of the present invention by taking as an example a case of using the same data as the above-mentioned one (see FIG. 12) while referring to a timing chart in FIG. 10 together with FIG. 1 through FIG. 3, FIG. 8 and FIG. 9. Here, note that the initial phase of the central value at the time of engine designing is used as the reference phase φB, as previously stated. Also, similarly as stated above (see FIG. 6), in FIG. 10, the data before correction and the result of the data after correction on which the above-mentioned correction processing is carried out in engine A are shown while coordinating them with the crank angle reference position. In FIG. 10, an initial phase A0 corresponds to the above-mentioned initial phase φ0; a reference phase M0 corresponds to the reference phase φB; and phases A1 through A4 correspond to the shifted or deviated detected phase value φ2. In addition, an abnormality determination lower limit threshold MMN and an abnormality determination upper limit threshold MMX in FIG. 10 correspond to the lower limit threshold φMN and the upper limit threshold φMX, respectively. Further, both of corrected lower limit thresholds AMN' and BMN' in FIG. 10 correspond to the lower limit threshold φMN, and both corrected upper limit thresholds AMX' and BMX' correspond to the upper limit threshold φMX.

In FIG. 10, the reference phase M0 exceeds the initial phase A0, so it is determined as φ0≦φB in step S106 in FIG. 9 (that is, NO). Accordingly, in the following step S107, the abnormality determination lower limit threshold MMN and the abnormality determination upper limit threshold MMX are respectively subtracted by a phase deviation (M0−A0) between the reference phase M0 and the initial phase A0 so that they are corrected to provide the corrected lower limit threshold AMN' and the corrected upper limit threshold AMX'. Thus, the respective corrected thresholds AMN' and AMX' (see an after-correction phase (after correction) just below a before-correction phase before correction) of engine A in FIG. 10) set for the respective phases A1 through A4 of engine A are used as the reference values for abnormality determination processing in steps S116 and S117 in FIG. 9.

Also, in FIG. 10, correction is applied to the data before correction (before-correction data) in engine B, similar to the case of engine A. At this time, an initial phase B0 in FIG. 10 corresponds to the initial phase φ0, and respective phases B1 through B3 correspond to the shifted or deviated detected phase value φ2. In addition, the corrected lower limit threshold BMN' and the corrected upper limit threshold BMX' in FIG. 10 correspond to the corrected lower limit threshold φMN' and the corrected upper limit threshold φMX', respectively.

In FIG. 10, the reference phase M0 does not exceed the initial phase B0, so it is determined as φ0>φB in step S106 in FIG. 9 (that is, YES). Accordingly, in the following step S108, the abnormality determination lower limit threshold MMN and the abnormality determination upper limit threshold MMX are respectively added by a phase deviation (B0−M0) between the initial phase B0 and the reference phase M0 so that they are corrected to provide the corrected lower limit threshold BMN' and the corrected upper limit threshold BMX'. Thus, the respective corrected thresholds BMN' and BMX' (see an after-correction phase (after correction) just below a before-correction phase (before correction) of engine B in FIG. 10) set for the respective phases B1 through B3 of engine B are used as the reference values for abnormality determination processing in steps S116 and S117 in FIG. 9.

As shown in FIG. 10, the corrected determination reference φM' (the lower limit BMN'—the upper limit BMX' in engine A, or the lower limit AMN'—the upper limit AMX' in engine B), which is corrected based on the determination reference φM set at the time of engine designing, can be assumed to be an abnormality determination threshold to each of the initial phases A0 and B0. Accordingly, it is possible to achieve accurate abnormality determination processing by means of the corrected determination reference φM'.

FIG. 11 is an explanatory view that illustrates the results of abnormality determination in a table, in which there are shown the results of the abnormality determination processing performed by using corrected abnormality determination threshold settings (the lower limit threshold BMN'—the upper limit threshold BMX' in engine A and the lower limit threshold AMN'—the upper limit threshold AMX' in engine B) for the respective phases A1 through A4 and B1 through B3 (the detected phase value φ2) in the engines A and B, respectively. In FIG. 11, signs "O" and "X" for the presence and absence, respectively, of a difference are similar to the above-mentioned ones (see FIG. 7). As will be clear from FIG. 11, it is found that accurate abnormality determination results can be obtained corresponding to the states that should be originally or basically determined with respect to all the phases of the respective engines A and B.

As described above, the engine control apparatus according to the second embodiment of the present invention includes the crank angle sensor 31, the cam angle sensor 32, the valve operating mechanism that drives the intake valve 14 and the exhaust valve 15, and the control unit 33A that controls the engine 1 based on the crank angle and the cam angle thus detected, wherein the valve operating mechanism transmits the rotation of the crankshaft 6 to the camshafts 16, 17 through the timing wrapping member 5 thereby to drive the intake valve 14 and the exhaust valve 15.

The control unit 33A includes the phase detection section 40, the abnormality determination section 44A, the threshold storage section 43, the initial phase storage section 42, the threshold correction section 49 that calculates the corrected determination reference $\phi M'$, and the correction threshold storage section 50 that stores the corrected determination reference $\phi M'$.

The threshold correction section 49 serves to correct the determination reference $\phi M$ by using the initial phase $\phi 0$, calculate the corrected determination reference $\phi M'$, and input it to the correction threshold storage section 50.

The abnormality determination section 44A outputs an abnormality determination signal E indicative of the generation of an abnormality in the timing wrapping member 5 by referring to the corrected determination reference $\phi M'$ stored in the correction threshold storage section 50 when the phase (the detected phase value $\phi 2$) detected by the phase detection section 40 during operation of the engine 1 deviates from a correction determination reference range of from the corrected lower limit threshold $\phi MN$ to the corrected upper limit threshold $\phi MX$ defined on the basis of the corrected determination reference $\phi M'$.

Thus, the initial phases (A0, B0) in the individual engines (engines A, B) can be assumed as if they were themselves initial phases in the form of central values, by applying a correction using the initial phase $\phi 0$ and the reference phase $\phi B$ to the abnormality determination reference $\phi M$ (set as the lower limit threshold $\phi MN$ and the upper limit threshold $\phi MX$) that is set to a value, with which an abnormality in the engine 1 can not be caused due to a secular change, for the initial phase $\phi 0$ of the central value at the time of designing the engine 1 thereby to provide the corrected determination reference $\phi M'$. As a result, the determination reference (the abnormality determination threshold) in each of the individual engines A and B is corrected to a value corresponding to the first threshold setting. Therefore, similarly as stated above, it is possible to achieve highly accurate abnormality determination processing for only a deviation of the phase $\phi$ due to a secular change without taking account of the existence of individual product errors.

In addition, the abnormality determination processing is executed by using, for the detected phase value $\phi 2$, the corrected determination reference $\phi M'$ (the corrected abnormality determination threshold) stored in the correction threshold storage section 50 comprising a nonvolatile memory. As a result, the correction processing and the abnormality determination processing can be executed at high speed as compared with the above-mentioned first embodiment in which a correction is carried out upon each phase detection.

Moreover, the control unit 33A includes the phase identification section 41 to which the tester 34 is connected only at the time of installation of the engine 1. The phase identification section 41 inputs the phase $\phi$ detected by the phase detection section 40 to the initial phase storage section 42 as an initial phase $\phi 0$ when a connection signal TS from the tester 34 is input, and inputs the phase $\phi$ detected by the phase detection section 40 to the abnormality determination section 44A as a detected phase value $\phi 2$ when a connection signal TS from the tester 34 is not input. The abnormality determination section 44A outputs an abnormality determination signal E based on a comparison between the detected phase value $\phi 2$ and the corrected determination reference $\phi M'$ (the corrected lower limit threshold $\phi MN'$ and the corrected upper limit threshold $\phi MX'$). Accordingly, it is possible to achieve highly accurate abnormality determination processing.

Further, provision is made for the warning light 35 that serves to provide a warning indication upon occurrence of an abnormality in the timing wrapping member 5, and the control unit 33A includes the warning section 47 that drives the warning light 35 in response to the abnormality determination signal E. Also, provision is made for the injector 36 and the spark plug 22 of the engine 1 that are adapted to be driven by the control unit 33A, and the control unit 33A includes the engine stopping section 48 that serves to stop at least one of the injector 36 and the spark plug 22 in response to the abnormality determination signal E. With such an arrangement, it is possible to achieve abnormality determination processing with high precision in individual engines. In addition, when it is determined that the timing wrapping member 5 is abnormal, the warning light 35 is driven to light in response to an output of the abnormality determination signal E, so that the abnormal state of the timing wrapping member 5 can be notified to an operator, thus prompting him or her to take an appropriate abnormality countermeasure.

Moreover, by performing such a countermeasure as stopping the fuel supply from the injector 36 or stopping the driving of the spark plug 22, it is possible to stop the operation of the engine 1 with the abnormal timing wrapping member 5. Specifically, when the abnormality determination signal E is output, the deterioration of the air fuel ratio in the engine 1 can be prevented by the processing operation of the warning section 47 or the engine stopping section 48, whereby it is possible to avoid the occurrence of knocking, reduction in fuel mileage, the deterioration of the exhaust emission, etc., in a reliable manner.

While the invention has been described in terms of preferred embodiments, those skilled in the art will recognize that the invention can be practiced with modifications within the spirit and scope of the appended claims.

What is claimed is:

1. An engine control apparatus comprising:
   a crank angle detection section that detects a crank angle of a crankshaft of an engine;
   a cam angle detection section that detects a cam angle of a camshaft of said engine;
   a valve operating mechanism that drives an intake valve and an exhaust valve of said engine; and
   a control unit that controls said engine based on said crank angle and said cam angle;
   wherein said valve operating mechanism has a timing wrapping member, wrapped between said crankshaft and said camshaft, and transmits the rotation of said crankshaft to said camshaft through said timing wrapping member whereby said intake valve and said exhaust valve are driven to operate in accordance with the rotation of said camshaft;
   said control unit comprising:
   a phase detection section that detects a phase of said camshaft relative to said crankshaft based on said crank angle and said cam angle;

an abnormality determination section that makes a determination, based on the phase detected by said phase detection section, as to whether said valve operating mechanism is abnormal;

a threshold storage section that stores, as a lower limit threshold and an upper limit threshold, phases which become determination references of said abnormality determination section;

an initial phase storage section that stores an initial phase detected by said phase detection section at the time of installation of said engine; and a phase correction section that corrects the phase detected by said phase detection section during operation of said engine with the use of said initial phase thereby to calculate a corrected phase, wherein when said corrected phase deviates from a determination reference range of from said lower limit threshold to said upper limit threshold, said abnormality determination section outputs an abnormality determination signal indicative of the generation of abnormality in said timing wrapping member.

2. The engine control apparatus as set forth in claim 1, wherein:

said control unit further includes a phase identification section to which a tester is connected only at the time of installation of said engine;

when a connection signal from said tester is input, said phase identification section inputs the phase detected by said phase detection section to said initial phase storage section as an initial phase, whereas when a connection signal from said tester is not input, said phase identification section inputs the phase detected by said phase detection section to said phase correction section as a detected phase value; and said phase correction section inputs said corrected phase based on said detected phase value to said abnormality determination section.

3. An engine control apparatus comprising:

a crank angle detection section that detects a crank angle of a crankshaft of an engine;

a cam angle detection section that detects a cam angle of a camshaft of said engine;

a valve operating mechanism that drives an intake valve and an exhaust valve of said engine; and a control unit that controls said engine based on said crank angle and said cam angle;

wherein said valve operating mechanism has a timing wrapping member, wrapped between said crankshaft and said camshaft, and transmits the rotation of said crankshaft to said camshaft through said timing wrapping member whereby said intake valve and said exhaust valve are driven to operate in accordance with the rotation of said camshaft;

said control unit comprising:

a phase detection section that detects a phase of said camshaft relative to said crankshaft based on said crank angle and said cam angle;

an abnormality determination section that makes a determination, based on the phase detected by said phase detection section, as to whether said valve operating mechanism is abnormal;

a threshold storage section that stores, as a lower limit threshold and an upper limit threshold, phases which become determination references of said abnormality determination section;

an initial phase storage section that stores an initial phase detected by said phase detection section at the time of installation of said engine;

a threshold correction section that calculates a correction determination reference by correcting said determination reference with the use of said initial phase; and a correction threshold storage section that stores said correction determination reference, wherein when the phase detected by said phase detection section during operation of said engine deviates from a corrected determination reference range of from a corrected lower limit threshold to a corrected upper limit threshold based on said correction determination reference, said abnormality determination section outputs an abnormality determination signal indicative of the generation of abnormality in said timing wrapping member.

4. The engine control apparatus as set forth in claim 3, wherein:

said control unit further includes a phase identification section to which a tester is connected only at the time of installation of said engine;

when a connection signal from said tester is input, said phase identification section inputs the phase detected by said phase detection section to said initial phase storage section as an initial phase, whereas when a connection signal from said tester is not input, said phase identification section inputs the phase detected by said phase detection section to said abnormality determination section as a detected phase value; and said abnormality determination section outputs said abnormality determination signal based on a comparison between said detected phase value and said correction determination reference.

5. The engine control apparatus as set forth in claim 1, further comprising:

a warning light that provides a warning indication upon occurrence of an abnormality in said timing wrapping member;

wherein said control unit further includes a warning section that drives said warning light in response to said abnormality determination signal.

6. The engine control apparatus as set forth in claim 1, further comprising:

an injector and a spark plug for said engine that are driven to operate by means of said control unit;

wherein said control unit further includes an engine stopping section that stops at least one of said injector and said spark plug in response to said abnormality determination signal.

7. The engine control apparatus as set forth in claim 1, wherein the phase correction section corrects the phase detected by the phase detection section by:

determining a phase deviation using the initial phase and a reference phase set when the engine is designed; and adding or subtracting the phase deviation to or from the phase detected by the phase detection section.

8. The engine control apparatus as set forth in claim 1, wherein:

the phase deviation is subtracted from the phase detected by the phase detection section when the initial phase exceeds the reference phase; and the phase deviation is added to the phase detected by the phase detection section when the initial phase does not exceed the reference phase.

9. The engine control apparatus as set forth in claim 3, further comprising:

a warning light that provides a warning indication upon occurrence of an abnormality in said timing wrapping member;

wherein said control unit further includes a warning section that drives said warning light in response to said abnormality determination signal.

10. The engine control apparatus as set forth in claim 3, further comprising:

an injector and a spark plug for said engine that are driven to operate by means of said control unit;

wherein said control unit further includes an engine stopping section that stops at least one of said injector and said spark plug in response to said abnormality determination signal.

11. The engine control apparatus as set forth in claim 1, wherein the threshold correction section corrects the determination reference by:

determining a phase deviation using the initial phase and a reference phase set when the engine is designed; and adding or subtracting the phase deviation to or from the determination reference.

12. The engine control apparatus as set forth in claim 1, wherein:

the phase deviation is subtracted from the determination reference when the reference phase exceeds the initial; and the phase deviation is added to the determination reference when the reference phase does not exceed the initial phase.

\* \* \* \* \*